(12) United States Patent
Ota et al.

(10) Patent No.: US 6,484,597 B2
(45) Date of Patent: Nov. 26, 2002

(54) METHOD AND APPARATUS FOR CONTROLLING GEAR-SHIFT OF MOTOR-DRIVEN GEAR SHIFTER

(75) Inventors: Atsuo Ota, Saitama (JP); Toshiya Nagatsuyu, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 7 days.

(21) Appl. No.: 09/801,644

(22) Filed: Mar. 9, 2001

(65) Prior Publication Data

US 2001/0023619 A1 Sep. 27, 2001

(30) Foreign Application Priority Data

Mar. 10, 2000 (JP) ........................................ 2000-067226

(51) Int. Cl.[7] ........................ F16H 59/00; F16H 61/00; F16H 63/00
(52) U.S. Cl. ............................................................ 74/335
(58) Field of Search ................................. 74/335, 337.5

(56) References Cited

U.S. PATENT DOCUMENTS

| | | | | |
|---|---|---|---|---|
| 4,192,276 A | * | 3/1980 | Ishihara et al. | 477/167 |
| 4,879,919 A | | 11/1989 | Sekizaki | |
| 5,024,113 A | * | 6/1991 | Ito et al. | 123/179.1 |
| 5,030,179 A | * | 7/1991 | Ganoung | 475/50 |
| 5,181,893 A | * | 1/1993 | Ashikawa et al. | 475/203 |
| 5,239,894 A | * | 8/1993 | Oikawa et al. | 123/399 |
| 5,395,293 A | * | 3/1995 | Matsuura et al. | 477/15 |
| 5,590,563 A | * | 1/1997 | Kuwahata et al. | 74/337.5 |
| 6,073,507 A | * | 6/2000 | Ota et al. | 477/906 |
| 6,085,607 A | * | 7/2000 | Narita et al. | 192/3.56 |
| 6,095,004 A | * | 8/2000 | Ota et al. | 74/336 R |
| 6,117,046 A | * | 9/2000 | Ota et al. | 477/79 |
| 6,142,123 A | * | 11/2000 | Galasso et al. | 123/486 |
| 6,220,109 B1 | * | 4/2001 | Fischer et al. | 74/337.5 |
| 6,249,734 B1 | * | 6/2001 | Ota | 701/110 |
| 6,341,680 B1 | * | 1/2002 | Ota et al. | 192/3.55 |

FOREIGN PATENT DOCUMENTS

| | | |
|---|---|---|
| EP | 0422444 A | 4/1991 |
| JP | A539865 | 2/1993 |
| JP | A1182709 | 3/1999 |
| JP | 11082710 A | 3/1999 |
| JP | 11082710 * | 3/1999 ................. 74/335 |

* cited by examiner

*Primary Examiner*—Jack Lavinder
*Assistant Examiner*—Devon Kramer
(74) *Attorney, Agent, or Firm*—Birch, Stewart, Kolasch & Birch, LLP

(57) ABSTRACT

To provide a method and an apparatus for controlling a gear-shift of a motor-driven gear shifter in which the gear-shift is electrically performed by a motor. In particular, the present invention relates to a method and an apparatus for detecting a rotational position of a shift drum, when the shift operation is not normally ended, and thereby a shift drum is in the half-neutral state, which automatically executes the shift operation. In the method for controlling the gear-shift of the motor-driven gear shifter, the motor is driven in a desired shift direction, to intermittently turn a shift drum, thereby shifting one gear stage to another gear stage. The rotational position of the shift drum is monitored, and when the shift drum stays at a rotational position other than a rotational position corresponding to a desired gear stage, the motor is re-driven in the shift direction.

15 Claims, 21 Drawing Sheets

(PRIOR ART)

(PRESENT INVENTION)

METHOD AND APPARATUS FOR CONTROLLING GEAR-SHIFT OF MOTOR-DRIVEN GEAR SHIFTER

BACKGROUND OF THE INVENTION

1. Field of the Invention

The present invention relates to a method and apparatus for controlling a gear-shift of a motor-driven gear shifter in which the gear-shift is electrically performed by a motor. In particular, the present invention relates to a method and an apparatus for detecting a rotational position of a shift drum, when the shift operation is not normally ended and thereby the shift drum is in the half-neutral state, which automatically executes the shift operation.

2. Description of Related Art

A motor-driven gear shifter in which gear-shift is electrically performed by response to a shift-up or shift-down operation has been disclosed in Japanese Patent Laid-open No. Hei 5-39865. Further, a motor-driven gear shifter in which not only the shift operation but also the clutch connection/disconnection is performed by a motor has been disclosed by the present applicant in Japanese Patent Laid-open No. Hei 11-82709.

In the above-described motor-driven gear shifters, when the motor is driven to a desired shift direction, a shift drum is intermittently turned via a ratchet mechanism, and a shift fork engaged with the shift drum is translated up to a specific position in the parallel direction. A sleeve is engaged with a tip of the shift fork. The sleeve is translated along with the translation of the shift fork, to be meshed with a gear corresponding to a desired gear-shift stage, thereby transmitting a drive force of an engine to a drive wheel at a specific reduction ratio.

In the above-described motor-driven gear shifter, however, there may occur a pseudo neutral state (referred to sometimes as "half neutral state") in which even if the shift drum is turned to a normal intermittent angle and the sleeve moved by the shift fork is temporarily meshed with the gear, the sleeve having been once meshed with the gear is released therefrom depending on a difference in rotation and a difference in phase upon meshing operation between the sleeve and the gear, thereby failing to transmit the drive force of the engine to the drive wheel.

In such a case, for a conventional semi-automatic motor-driven gear shifter in which a shift operation is required to be performed upon a gear-shift, it is required to release the shift drum from the half neutral state by repeating the shift operation by a driver who has found the half neutral state.

On the contrary, for a full-automatic motor-driven gear shifter in which gear-shift is automatically performed with a vehicle speed and a throttle opening degree taken as parameters, since the gear-shift operation cannot be repeated by the driver's intention even if the shift drum has been in the half neutral state, with a result that the shift drum cannot be quickly released from the half neutral state.

SUMMARY OF THE INVENTION

An object of the present invention is to solve the above-described prior art technical problem, and to provide a method and an apparatus for controlling a gear-shift of a motor-driven gear shifter, which are capable of detecting, when the shift operation is not normally ended and thereby a shift drum is in the half neutral state, which automatically executes the shift operation again.

To achieve the above object, the present invention provides a method and an apparatus for controlling gear-shift of a motor-driven gear shifter in which a motor is driven in a desired shift direction, to intermittently turn a shift drum, thereby shifting one gear stage to another gear stage.

The above-described method is characterized in that the rotational position of the shift drum is monitored, and when the shift drum stays at a rotational position other than a rotational position corresponding to a desired gear stage.

The above-described apparatus is characterized by including detecting means for detecting the rotational position of the shift drum; and retry-shift means for re-driving, when the shift drum stays at a rotational position other than a normal rotational position, the motor in the shift direction.

With this configuration, it is electrically detected whether or not the shift drum is at the half neutral position, and if the shift drum is at the half neutral position, retry-shift operation is automatically performed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
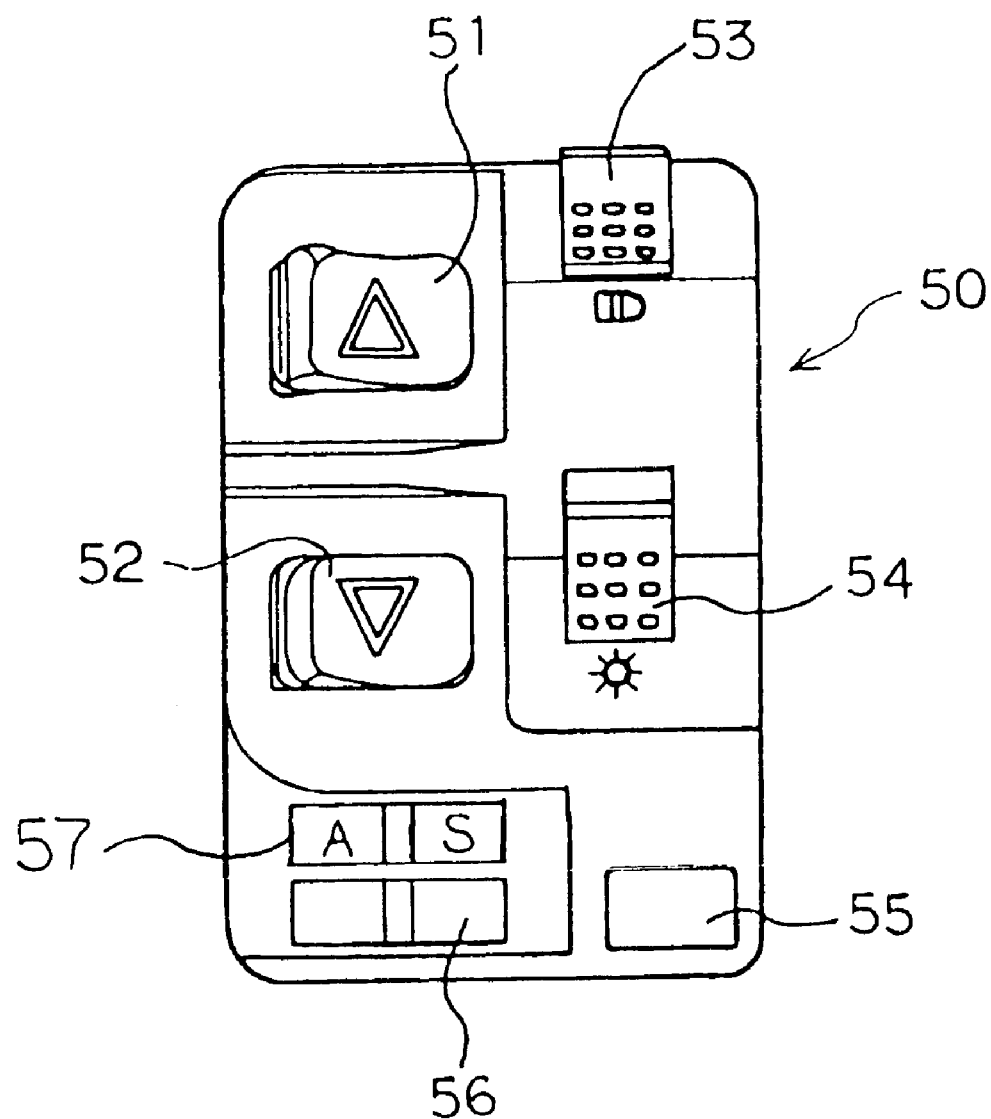
FIG. 1 is a plan view of an operational portion of a vehicle on which a motor-driven gear shifter of the present invention is mounted.

Hereinafter, the present invention will be described in detail with reference to the drawings. FIG. 1 is a plan view of an operational portion of a vehicle on which a motor-driven gear shifter of the present invention is mounted.

The vehicle includes an "auto" mode in which gear shift is automatically performed according to a vehicle speed and a throttle opening degree, and a "semi-auto" mode performed in response to a shift operation by a driver.

An operating portion 50 is provided with a mode setting switch 57 for setting a shift mode of a gear into the "auto" mode or "semi-auto" mode, and a shift-up switch 51 and a shift-down switch 52 operated in the "semi-auto" mode. In the "semi-auto" mode, each time the shift-up switch 51 is depressed to be turned on, the shift position is shifted up by one stage, and each time the shift-down switch 52 is depressed to be turned on, the shift position is shifted down by one stage. The operating portion 50 is further provided with a dimmer switch 53 for switching the direction of a headlamp, a lighting switch 54 for switching the turn-on/turn-off of the headlamp, a start switch 55 for starting an engine, and a stop switch 56 for stopping the engine.

Figure 2:
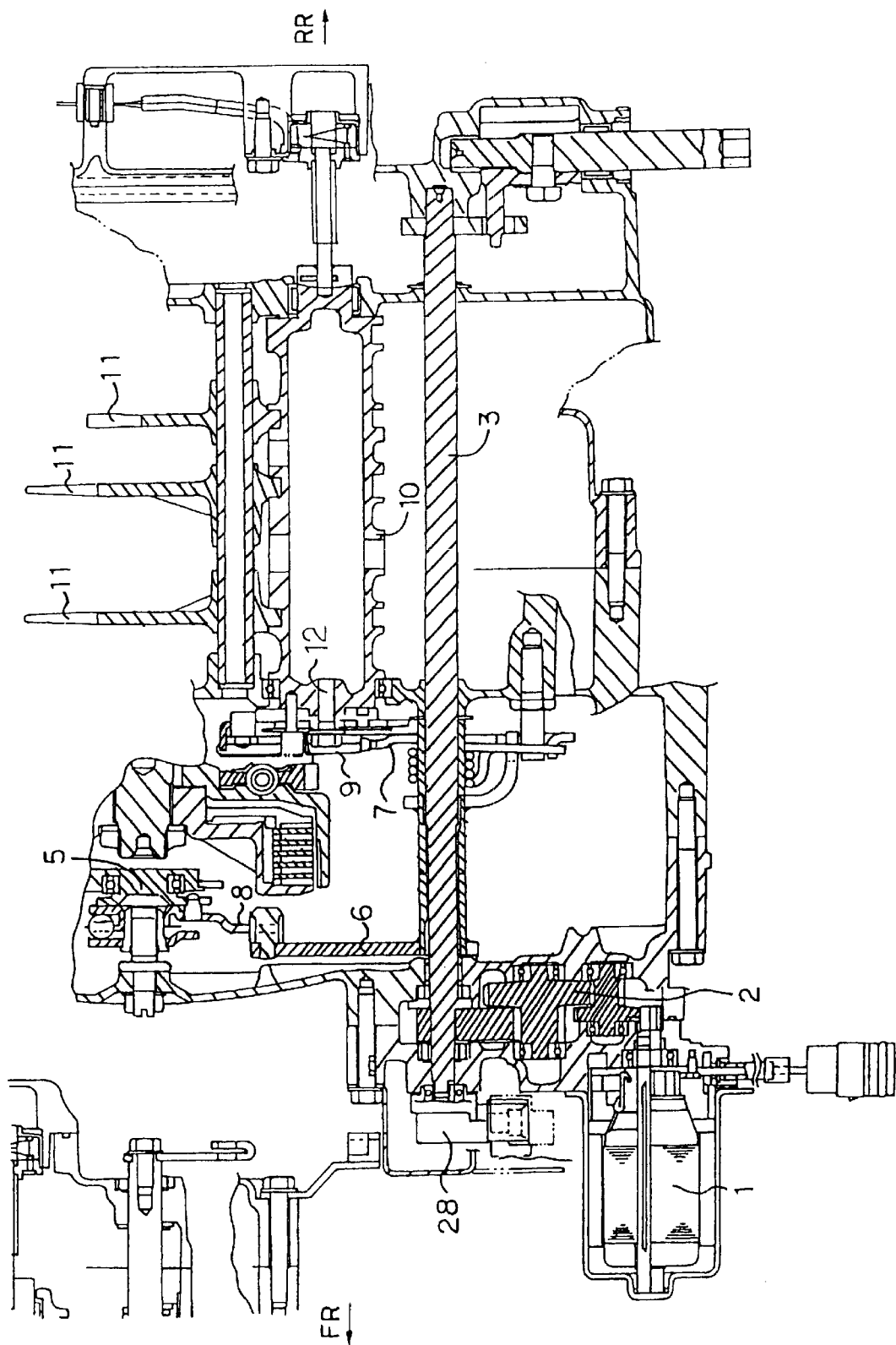
FIG. 2 is a partial sectional view showing a configuration of a principal portion of a drive system of the motor-driven gear shifter according to one embodiment of the present invention.

FIG. 2 is a partial sectional view showing a configuration of a principal portion of a drive system of the motor-driven gear shifter according to the embodiment of the present invention.

A shift spindle 3 is normally or reversely turned via a reduction gear mechanism 2 by a drive motor 1 as an electric actuator. A turning position (turning angle) of the shift spindle 3 is detected by an angle sensor 28 provided at one end of the shift spindle 3. A conversion mechanism 8 for converting a turning motion of the shift spindle 3 into a linear motion is provided at one end of a clutch arm 6 extending upright from the shift spindle 3. When the shift spindle 3 is turned from a neutral position by the drive motor 1, the connection state of a gear shift clutch 5 is released irrespective of the turning direction of the shift spindle 3, and when the shift spindle 3 is reversely turned to the neutral position by the drive motor 1, the disconnection state of the gear shift clutch 5 is returned again into the connection state. The clutch arm 6 and the conversion mechanism 8 are configured such that the connection state of the gear shift clutch 5 is released when the shift spindle 3 is turned to a specific angle (for example, ±6).

One end of a master arm 7 fixed to the shift spindle 3 is engaged with a ratchet mechanism 9 provided on a shift drum shaft 12. When the shift spindle 3 is turned by the drive motor 1, the shift drum 10 is turned in the direction corresponding to the turning direction of the shift spindle 3. When the shift spindle 3 is turned in the normal or reverse direction from the neutral position, the master arm 7 and the ratchet mechanism 9 are engaged with the shift spindle 3, to thus turn the shift drum 10, and when the shift spindle 3 is turned in the direction where it is returned to the neutral position, the engagement of the master arm 7 and ratchet mechanism 9 with the shift spindle 3 is released, so that the shift drum 10 is left at the above-described turned position.

Figure 28:
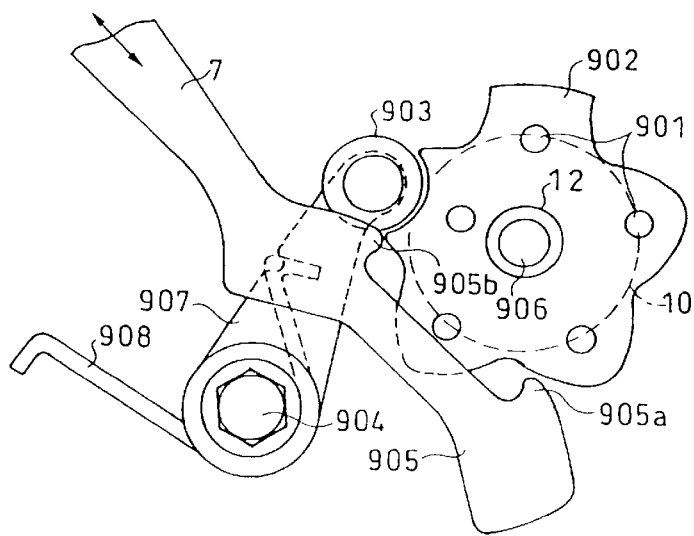
FIG. 28 is a view showing a configuration of a principal portion of ratchet mechanism.

FIG. 28 is a sectional view, taken on a plane perpendicular to the shift drum shaft 12, showing a configuration of a principal portion of the ratchet mechanism 9. A cam plate 902 having an end surface formed into a corrugated shape is fixed to an end portion of the shift drum shaft 12. A plurality of shift pins 901 are erected from the surface of the cam plate 902 in such a manner as to surround the shift drum shaft 12.

A pulling claw 905a and a pushing claw 905b are formed at one end 905 of the master arm 7. When the master arm 7 is moved forward by the normal turning of the shift spindle 3, the pushing claw 905b is engaged with the shift pin 901 to turn the cam plate 902 counterclockwise, whereby the shift drum 10 is turned counterclockwise. On the contrary, when the master arm 7 is moved backward by the reverse turning of the shift spindle 3, the pulling claw 905a is engaged with the shift pin 901 to turn the cam plate clockwise, whereby the shift drum 10 is turned clockwise.

In the vicinity of the cam plate 902, a stopper arm 907 is rockably supported by a rocking shaft 904. A cam stopper 903, which functions to be engaged in a recess of the cam plate 902 for blocking the rotation of the cam plate 902, is provided at the rocking end of the stopper arm 907. The stopper arm 907 is usually biased clockwise in the figure by a spring 908.

Figure 29:
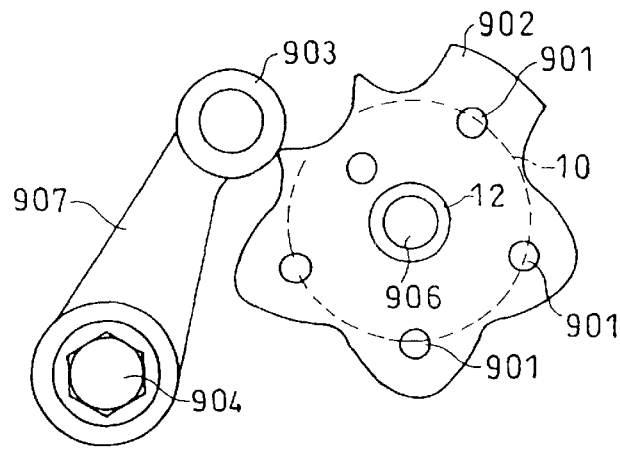
FIG. 29 is a view showing a half neutral state.
Figure 30:
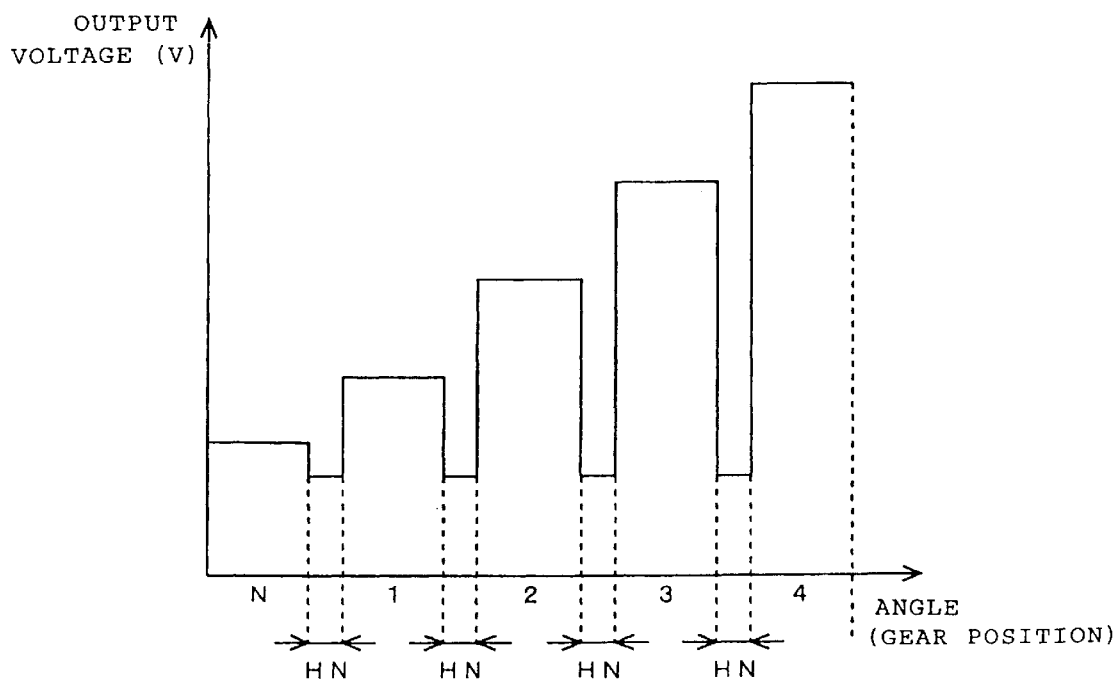
FIG. 30 is a graph showing a relationship between a rotational position of a shift drum and an output of a shift drum sensor.
Figure 31:
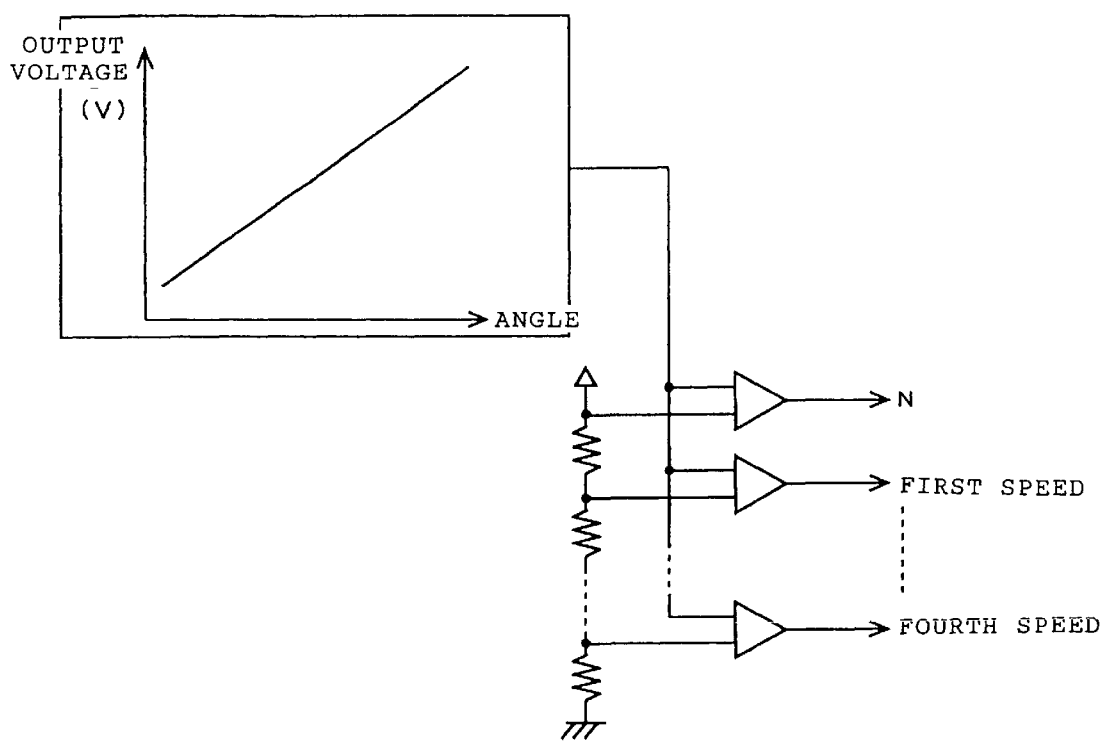
FIG. 31 is a diagram showing another configuration sample of the shift drum sensor.

A shift drum sensor 906 for detecting the rotational position of the shift drum shaft 12 is provided on the shift drum shaft 12. The shift drum sensor 906 is configured, for example, as a rotary encoder. In this embodiment, as shown in FIG. 30, at a normal gear shift position (N, 1, 2, 3, 4) at which the cam stopper 903 is engaged in a specific recess of the cam plate 902, the shift drum sensor 906 generates an output voltage corresponding to the gear shift stage. In a half neutral (HF) state in which the cam stopper 903 rides on a projection of the cam plate 902 as shown in FIG. 29, the shift drum sensor 906 outputs a voltage at a specific low level irrespective of the rotational position of the shift drum 10.

The tip of each of shift forks 11 is engaged in an outer peripheral groove 31 of the corresponding one of sleeves 30 which will be described in detail later with reference to FIG. 4. When the shift forks 11 are axially translated by the turning motion of the shift drum 10, any one of the sleeves is translated on a main shaft 4 in accordance with the turning direction and turning angle of the shift drum 10.

Figure 4:
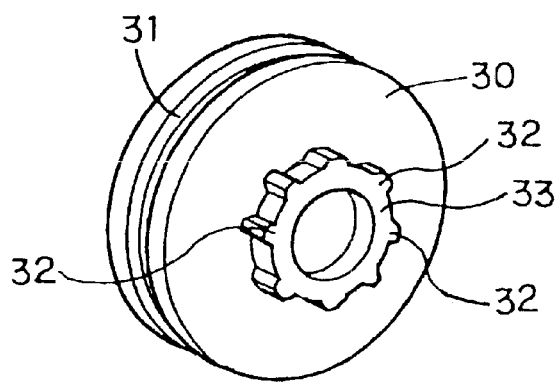
FIG. 4 is a perspective view of the sleeve shown in FIG. 3.

FIG. 4 is a perspective view of the sleeve designated by reference numeral 30. The sleeve 30 is inserted on the main shaft (not shown) in such a manner as to be axially slidably movable on the main shaft. A groove 31, in which the tip of the shift fork 11 is to be engaged, is formed in an outer peripheral side surface of the sleeve 30 in such a manner as to extend in the circumferential direction. A plurality of projecting side dowels 32 to be engaged with recess side dowels 42 of a gear 40 (which will be described with reference to FIG. 5) are integrally formed, together with an annular flange 33, on an outer peripheral portion of an axial hole of the sleeve 30.

Figure 3:
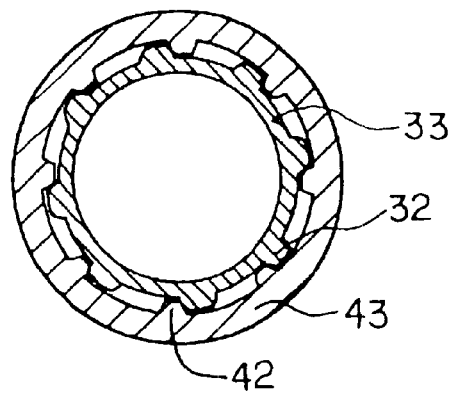
FIG. 3 is a conceptual view showing a state in which a sleeve according to the present invention is engaged with a gear according to the present invention.
Figure 5:
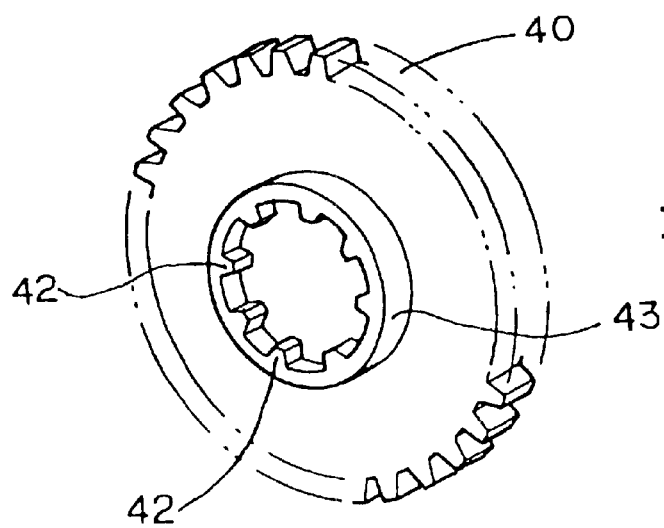
FIG. 5 is a perspective view of the gear shown in FIG. 3.

FIG. 5 is a perspective view of the gear 40 which is rotatably supported on the main shaft (not shown) at a specific position. A plurality of the recess side dowels 42 to be engaged with the projection side dowels 32 of the sleeve 30 are integrally formed, together with an annular flange 43, on an outer peripheral portion of an axial hole of the gear 40. FIG. 3 is a conceptual view showing a state in which the sleeve 30 is engaged to the gear 40 via the dowels 32 and 42.

Figure 9:
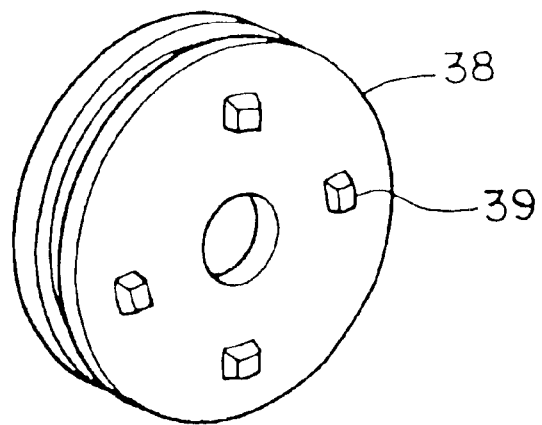
FIG. 9 is a perspective view of a sleeve of a prior art.
Figure 10:
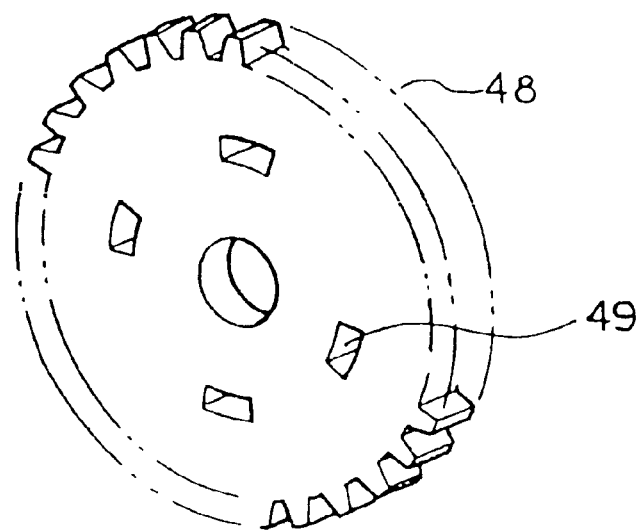
FIG. 10 is a perspective view of a gear of the prior art.

FIGS. 9 and 10 are perspective views of a sleeve 38 and a gear 48 according to a prior art, respectively. A plurality of projection side dowels 39 are independently provided on a side surface of the sleeve 38 in such a manner as to be disposed coaxially with an axial hole of the gear 48. In this configuration, however, to independently dispose the projection side dowels 39 on the side surface of the sleeve 38, the bottom area of each dowel 39 must be made relatively large for ensuring sufficient strength thereof. As a result, according to the prior art, a ratio of a width of the projection side dowel 39 in the turning direction to a width of a dowel hole 49 of the gear 48 in the turning direction becomes large. Therefore, as shown in FIG. 4, about four pieces of the projection side dowels 39 are provided on the side surface of the sleeve 38.

Figure 12:
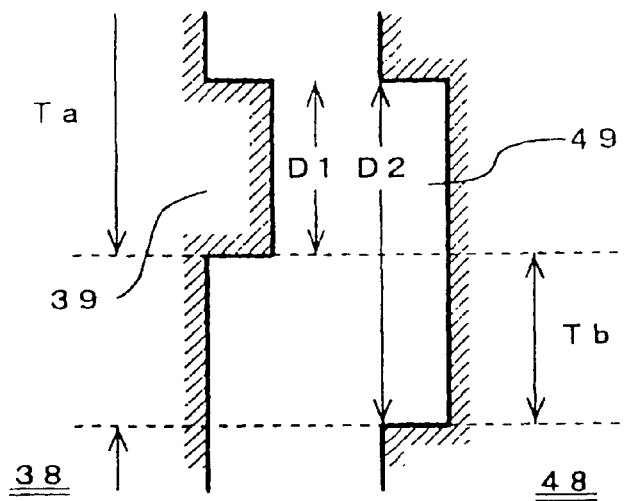
FIG. 12 is a schematic diagram showing an engagement timing between the sleeve and the gear of the prior art.

FIG. 12 is a schematic diagram showing a relative positional relationship between the projection side dowel 39 of the sleeve 38 and the dowel hole 49 of the gear 48 according to the prior art. As shown in this figure, a width D2 of the dowel hole 49 in the turning direction is as large as about twice a width D1 of the projection side dowel 39. Accordingly, a period Ta in which the projection side dowel 39 cannot be engaged or inserted in the dowel hole 49 becomes longer than a period Tb in which the projection side dowel 39 can be engaged or inserted in the dowel hole 49.

Figure 13:
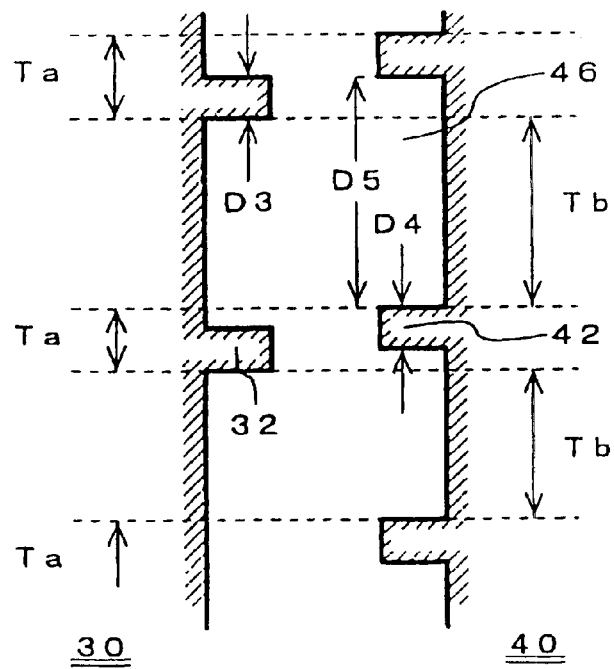
FIG. 13 is a schematic diagram showing an engagement timing between the sleeve and the gear according to the present invention.

On the contrary, according to this embodiment, since the projection side dowels 32 are integrally formed on the annular flange 33, it is possible to shorten, as shown in FIG. 13, a width D3 of the projection side dowel 32 in the turning direction while ensuring sufficient strength of the dowel 32 and correspondingly shorten a width D4 of the recess side dowel 42 of the gear 40. As a result, it is possible to make a period Ta, in which the projection side dowel 32 cannot be inserted in a dowel hole 46 between the recess side dowels 42, shorter than a period Tb, in which the projection side dowel 32 can be inserted in the dowel hole 46, and hence to improve the probability of dowel insertion.

According to this embodiment, a difference between the width D5 of the dowel hole 46 in the turning direction and the width D3 of the projection side dowel 32 can be made smaller than a difference between the width D2 of the dowel hole 49 in the turning direction and the width D1 of the projection side dowel 39 according to the prior art, and accordingly, it is possible to make smaller a play between the dowel hole 46 and the projection side dowel 32 engaged in the dowel hole 46 smaller, and hence to reduce noise caused by gear shift operation.

Figure 6:
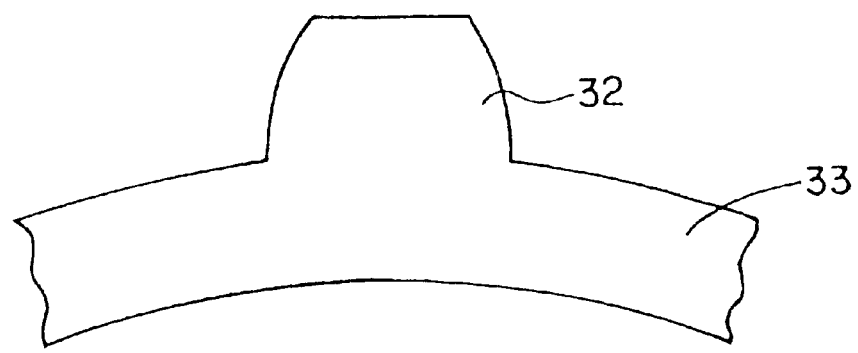
FIG. 6 is a partial enlarged view of a projection side dowel 32 of the sleeve shown in FIG. 4.
Figure 7:
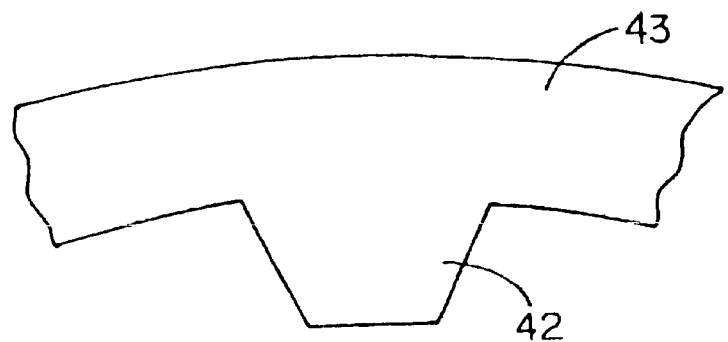
FIG. 7 is a partial enlarged view of a recess side dowel 42 of the gear shown in FIG. 5.
Figure 8:
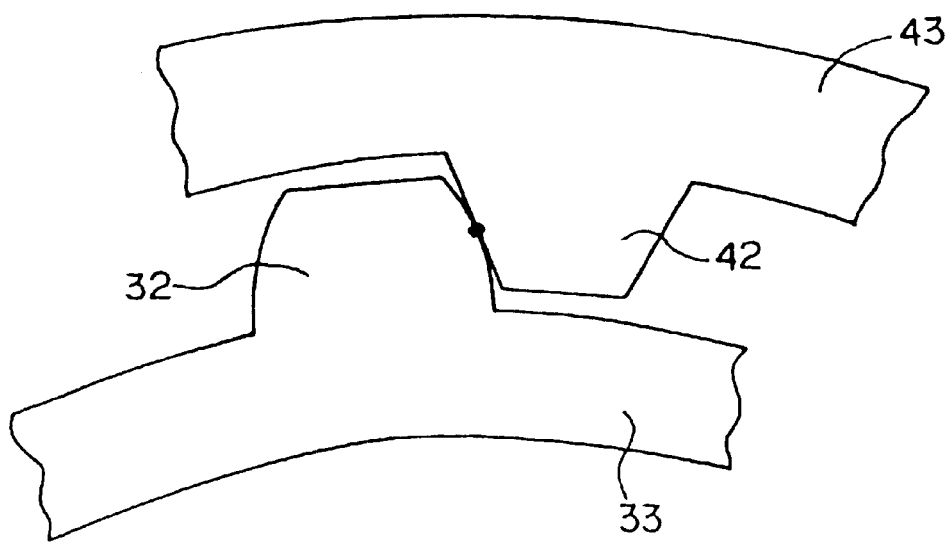
FIG. 8 is a view showing a state in which the projection side dowel 32 is engaged with the recess side dowel 42.

According to this embodiment, the taper of the projection side dowel is formed into an outwardly curved shape as shown in FIG. 6, and the taper of the recess side dowel 42 is formed into a straight-line shape as shown in FIG. 7. Accordingly, as shown in FIG. 8, the projection side dowel 32 can be brought into line-contact with the recess side dowel 42 along the axial direction. This makes it possible to prevent occurrence of stress concentration, and hence to substantially improve the strength of the dowels and enhance the durability and wear resistance of the dowels.

With this configuration, when the sleeve 30 is translated to a predetermined position by the shift fork 11 and the projection side dowels 32 of the sleeve 30 are inserted in the dowel holes 46 of the gear 40, as is well known, the gear which has been supported by the main shaft in an idle state is engaged with the main shaft via the sleeve 30, to be turned in synchronization with the main shaft. In this way, a rotational force transmitted from a clutch shaft to a counter shaft (both are not shown) is transmitted to the main shaft via the gear 40.

While not shown, the engine of the vehicle on which the motor-driven gear shifter to be controlled according to the present invention is a four-cycle engine in which a power of the engine is transmitted to a power transmission system, which is adapted to transmit a power from a crank shaft to a main shaft, via a centrifugal clutch on a crank shaft and a clutch on the main shaft. Accordingly, if the engine speed is a specific value or less, the power transmission to the clutch on the main shaft is cutoff by the centrifugal clutch. That is to say, upon stoppage of the vehicle, the gear can be shifted to any speed.

Figure 14:
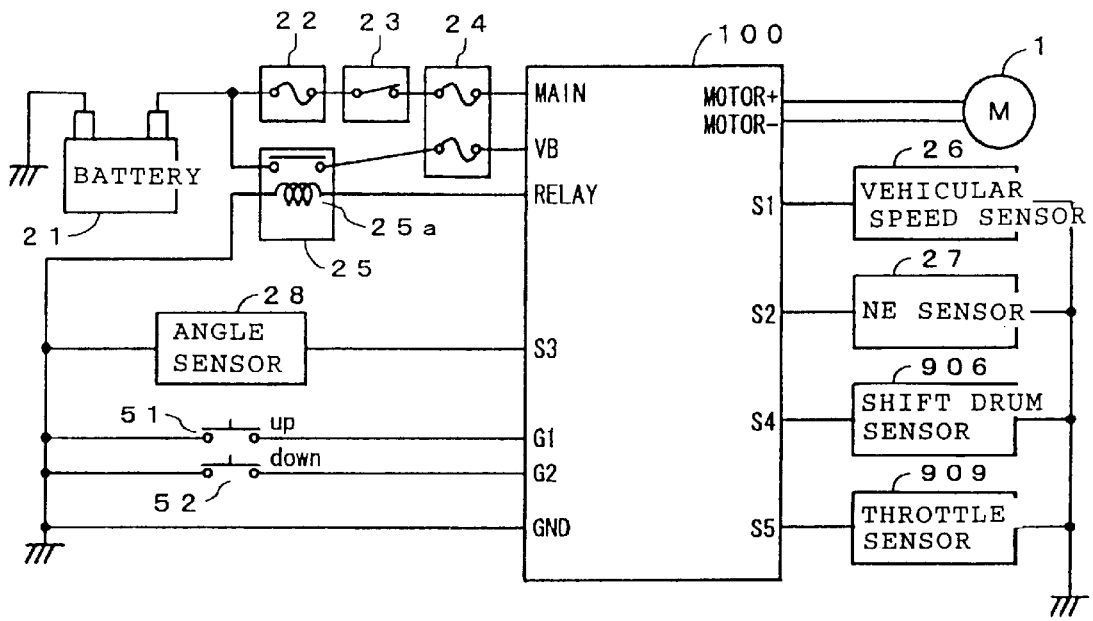
FIG. 14 is a block diagram showing a configuration of a principal portion of a control system of the motor-driven gear shifter according to the embodiment of the present invention.
Figure 15:
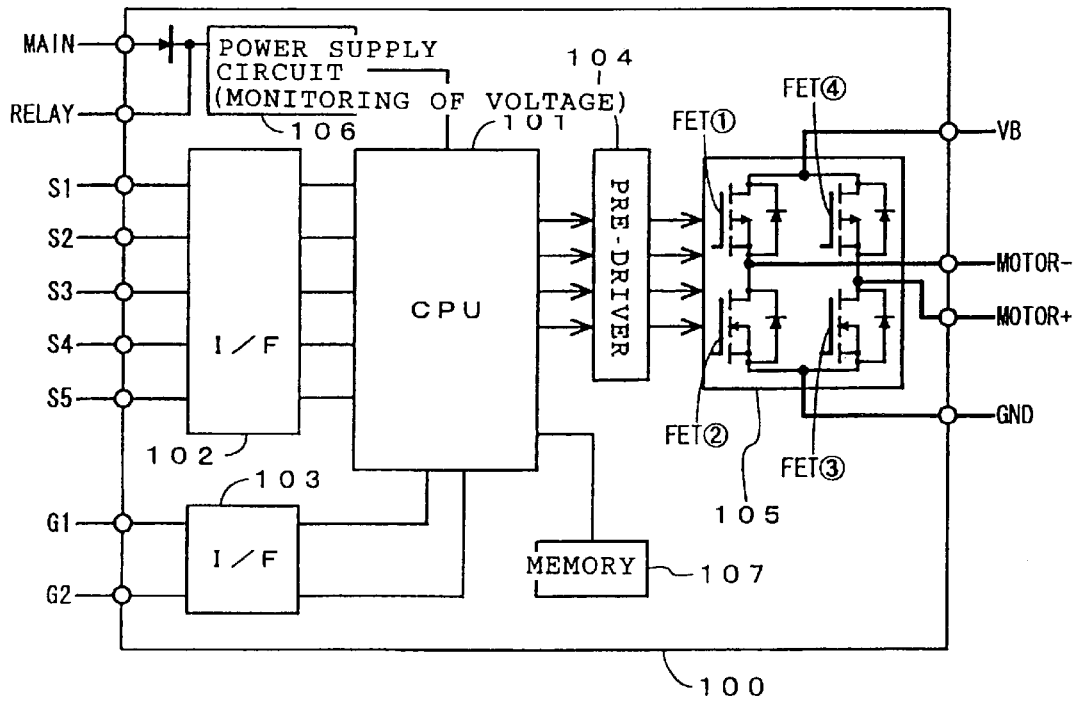
FIG. 15 is a block diagram showing a configuration example of an ECU 100 show in FIG. 14.

FIG. 14 is a block diagram showing a configuration of a principal portion of a control system of the motor-driven gear shifter according to the embodiment of the present invention, and FIG. 15 is a block diagram showing a configuration example of an ECU100 shown in FIG. 14.

Referring to FIG. 14, the drive motor 1 is connected to a MOTOR (+) terminal and a MOTOR (−) terminal of the ECU100, and a vehicular speed sensor 26 for detecting a vehicular speed, an Ne sensor 27 for detecting an engine speed, the angle sensor 28 for detecting a turning angle of the shift spindle 3, the shift drum sensor 906 for detecting the rotational position of the shift drum 10, and a throttle sensor 909 for detecting a throttle opening degree are connected to sensor signal terminals S1, S2, S3, S4, and S5, respectively. The shift-up switch 51 and the shift-down switch 52 are connected to gear shift command terminals G1 and G2, respectively.

A battery 21 is connected to a MAIN terminal of the ECU100 via a main fuse 22, a main switch 23, and a fuse box 24. The battery 21 is also connected to a VB terminal via a fuel safe (F/S) relay 25 and the fuse box 24. An excitation coil 25a of the fuel safe (F/S) relay 25 is connected to a RELAY terminal.

In the ECU100, as shown in FIG. 15, the MAIN terminal and RELAY terminal are connected to a power supply circuit 106, and the power supply circuit 106 is connected to a CPU101. The sensor signal terminals S1, S2, S3, S4, and S5 are connected to input terminals of the CPU101 via an interface circuit 102. The gear shift command terminals G1 and G2 are connected to input terminals of the CPU101 via an interface circuit 103.

A switching circuit 105 includes a FET (1), a FET (2), a FET (3), and a FET (4). The FETs (1) and (2) placed in series are connected in parallel to the FETs (3) and (4) placed in series, and one end of the parallel connection is connected to the VB terminal and the other end of the parallel connection is connected to a GND terminal. The connection point between the FETs (1) and (2) is connected to the MOTOR (−) terminal, and the connection point between the FETs (3) and (4) is connected to the MOTOR (+) terminal. Respective FETs (1) to (4) are selectively subjected to PWM control via a pre-driver 104 by the CPU101. The CPU 101 controls each of the FETs (1) to (4) on the basis of a control algorithm stored in a memory 107.

A gear shift method in this embodiment will be described below with reference to flowcharts shown in FIGS. 16 to 22 and FIG. 26 and an operational timing chart shown in FIG. 27.

Figure 16:
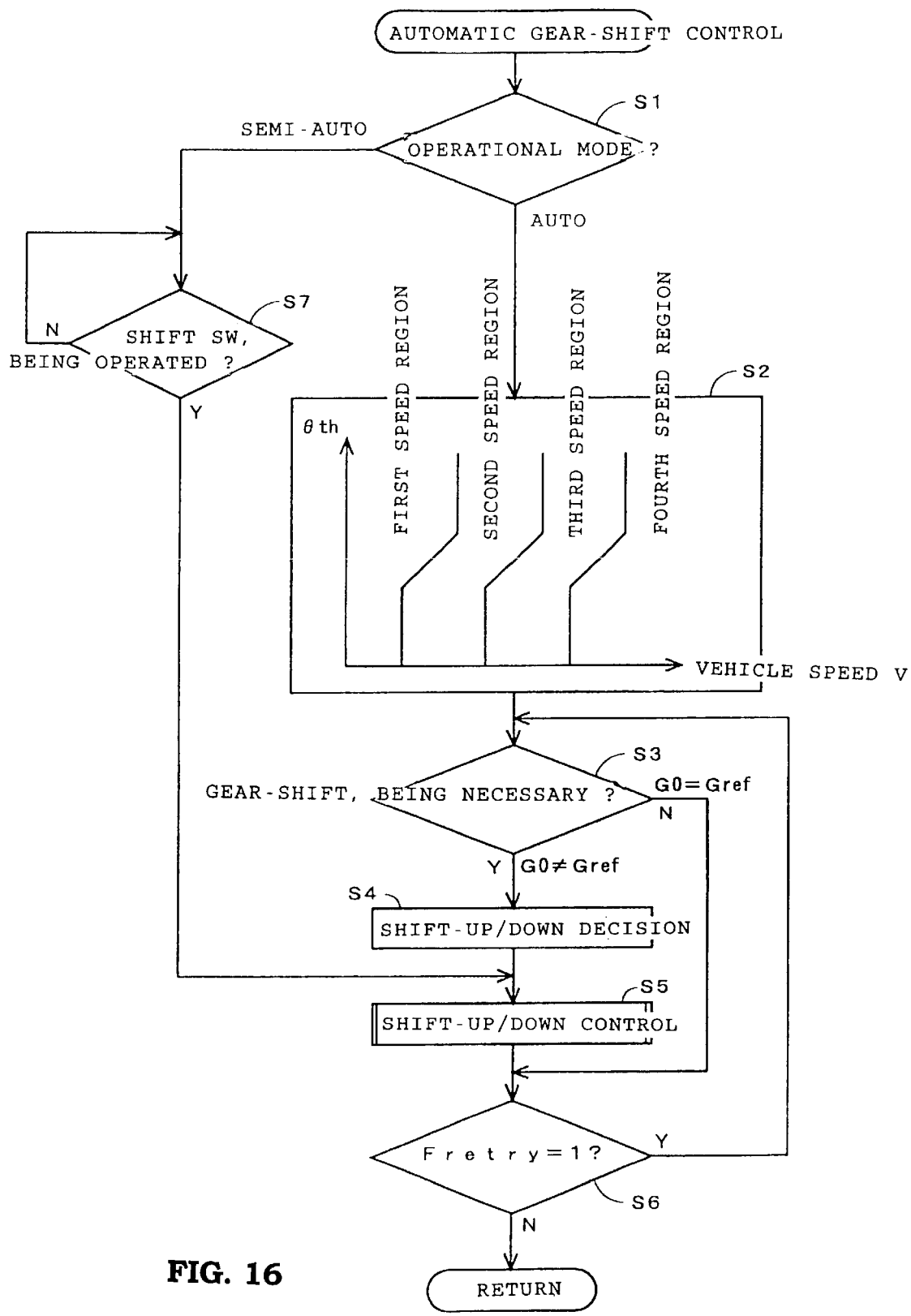
FIG. 16 is a main flow chart illustrating a gear shift process according to an embodiment of the present invention.

FIG. 16 is a main flow chart for an automatic gear shift control. At step S1 it is decided whether the gear shift mode is the "auto" mode or the "semi-auto" mode. If the gear shift mode is the "auto" mode, the process goes on to step S2 at which a target gear shift stage Gt is decided on the basis of the present vehicle speed V and throttle opening degree θ th. At step S3, the present gear shift stage G0 is compared with the target gear shift stage Gt. If the present gear shift stage G0 corresponds to the target gear shift stage Gt, which indicates that any gear shift is not required to be performed, the process goes on to step S6, and if it does not corresponds to the target gear shift stage Gt, which indicates automatic gear shift is required to be performed, the process goes on to step S4. At step S4, if G>Gt, it is decided that shift-down is required to be performed, and if G0<Gt, it is decided that shift-up is required to be performed.

On the other hand, if it is decided at step S1 that the gear shift mode is the "semi-auto" mode, the process goes on to step S7 at which it is decided whether or not either of the shift switches 51 and 52 is operated. If operated, the process goes on to step S5 at which "shift-up/shift-down control" is executed on the basis of the decided result in step S4 or the operated shift switch 51 or 52 decided in step S7.

The "shift-up/shift-down control" will be described with reference to a flow chart shown in FIG. 17.

At step S10, a retry-shift flag Fretry is reset. As will be described in detail, the retry-shift flag Fretry is set for executing, if the automatic gear shift is imperfectly completed, the shift operation again. At step S11, it is decided whether the present shift direction is shift-up. If during shift-up, the process goes on to step S13. If during shift-down, the process goes on to step S12 at which an engine speed Ne is stored as a variable Ne1, and the process goes on to step S13.

At step S13, respective FETs of the switching circuit 105 in the ECU100 are selectively subjected to PWM control in accordance with shift-up or shift-down direction. The PWM control starts from a time $t_1$ shown in FIG. 27. If during shift-up, the FETs (2) and (4) are subjected to PWM control at a 100% duty ratio with the FETs (1) and (3) left cutoff. As a result, the drive motor 1 begins to turn in the shift-up direction, and correspondingly the shift spindle 3 begins to turn in the shift-up direction.

If during shift-down, the FETs (1) and (3) are subjected to PWM control at a 100% duty ratio with the FETs (2) and (4) left cutoff. As a result, the drive motor 1 begins to turn in the shift-down direction reversed to the shift-up direction, and correspondingly the shift spindle 3 begins to turn in the shift-down direction.

Since the PWM control is performed at the 100% duty ratio, the gear shift speed can be increased and thereby the clutch connection can be quickly released. In this embodiment, the gear shifter is designed such that the clutch connection is released when the shift spindle is turned by an angle of 50° to 6°.

A first timer (not shown) starts time-counting at step S14, and an turning angle of the shift spindle 3 is detected by the angle sensor 28 at step S15. It is decided at step S16 whether or not the detected turning angle $θ_o$ exceeds a first reference angle REF which is ±14° in this embodiment. The expression "the detected turning angle $θ_o$ exceeds ±14°" means that the detected turning angle $θ_o$ becomes more than +14° or less than −14°.

If it is decided that the turning angle $θ_o$ exceeds ±14°, there is a strong possibility that the sleeve translated by the shift fork 11 reaches up to a normal dowel insertion position, and therefore, the process goes on to step S17. If it is decided that the turning angle $θ_o$ does not exceed ±14°, there is a strong possibility that the sleeve does not reach up to the normal dowel insertion position, and therefore, the process goes on to step S30 shown in FIG. 19 (which will be described later).

When the translational motion of the sleeve up to the normal dowel position is detected at a time t2 on the basis of the fact that the turning angle $θ_o$ is ±14° or more, the first timer is reset at step S17. At step S18, respective FETs of the switching circuit 105 are selectively subjected to PWM control in accordance with the present shift direction in order to brake the turning drive motor 1.

If during shift-up, the FETs (1) and (4) are subjected to PWM control at a 100% duty ratio with the FETs (2) and (3) left cutoff, and if during shift-down, the FETs (2) and (3) are subjected to PWM control at a 100% duty ratio with the FETs (1) and (4) left cutoff. As a result, the drive motor 1 is short-circuited, to function as a turning load, thereby braking the drive torque of the shift spindle 3 in the shift-up direction or shift-down direction. Accordingly, it is possible to ease the shock caused upon contact of the shift spindle 3 with a stopper. This is advantageous in terms of strength and noise. In addition, the turning angle of the shift spindle 3 upon contact with the stopper is set at 18°.

Figure 18:
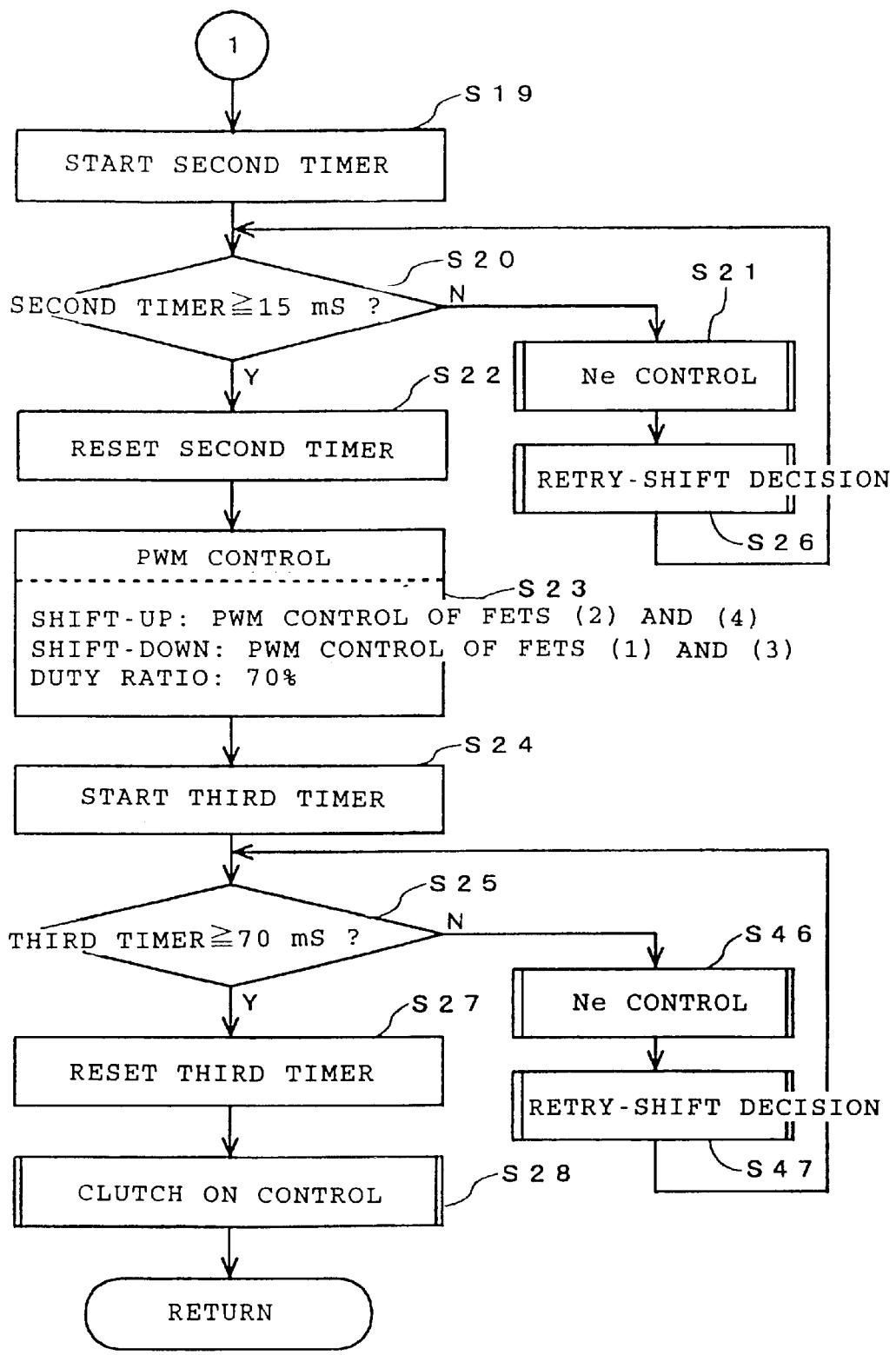
FIG. 18 is a flowchart (No. 2) illustrating the gear shift process according to the embodiment of the present invention.

Referring to FIG. 18, a second timer for specifying a braking time starts time-counting at step S19, and it is decided at step S20 whether or not the period of time counted by the second timer exceeds 15 ms. If No, the process goes on to step S21 at which "control of the engine speed (Ne)" to be described in detail later is executed. At step S26, "decision of retry-shift" to be described in detail later" is executed. If it is decided at step S20 that the period of time counted by the second timer exceeds 15 ms at a time t3, the process goes on to step S22 at which the second timer is reset.

At step S23, respective FETs of the switching circuit 105 are selectively subjected to PWM control in accordance with the present shift direction. If during shift-up, the FETs (2) and (4) are subjected to PWM control at a 70% duty ratio with the FETs (1) and (3) left cutoff, and if during shift-down, the FETs (1) and (3) are subjected to PWM control at a 70% duty ratio with the FETs (2) and (4) left cutoff. As a result, since the sleeve is pressed to the gear side with a relatively weak torque, it is possible to reduce a load applied to respective dowels until dowel insertion and to certainly hold the dowel insertion state.

A third timer starts time-counting at step S24, and it is decided at step S25 whether or not the period of time counted by the third timer exceeds 70 ms. If NO, the process goes on to step S46 at which the Ne control is executed. At step S47, the "decision of retry-shift" to be described in detail later is executed. After that, if it is decided that the period of time counted by the third timer exceeds 70 ms at step S25, the process goes on to step S27 at which the third timer is reset. At step S28, clutch ON control to be described in detail later starts at a time t4.

According to this embodiment, the timeout period (70 ms) of the third timer is determined on the period Ta, in which the dowel insertion is impossible, described with reference to FIG. 13. That is to say, the timeout period (70 ms) is set such that pressing control is executed at least during the period Ta. Although the projection side dowel is in press-contact with the recess side dowel during the period Ta, a load applied to each of the dowels is low because the duty ratio is reduced to 70%. This is advantageous in terms of the strength of the dowels.

The timeout period of the third time is not necessarily fixed at a specific value, but may be variably set as the function of the gear, for example, may be set at 70 ms in a gear shift range of the first, second, and third speeds and set at 90 ms in a gear shift range of the fourth and fifth speeds.

Figure 17:
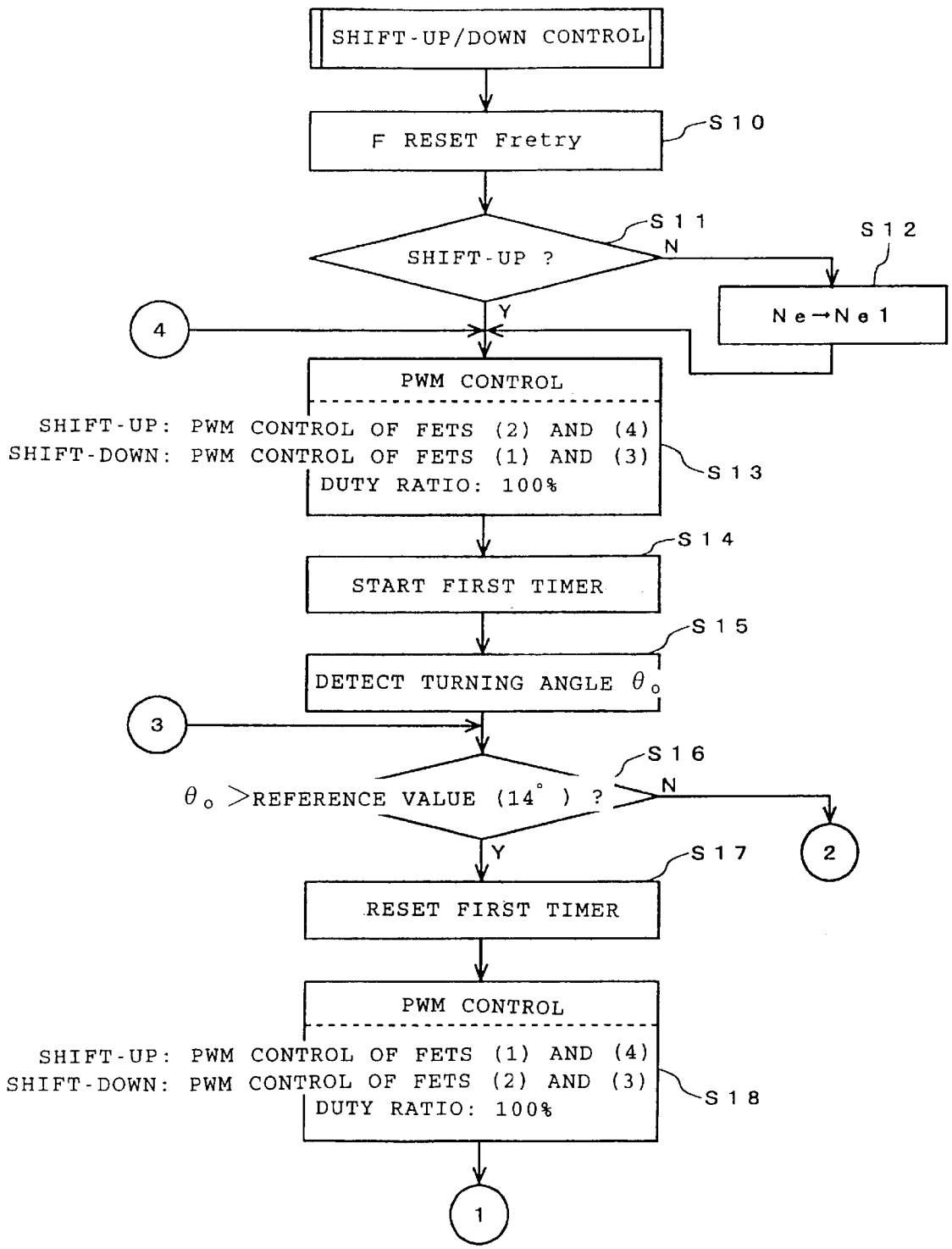
FIG. 17 is a flowchart (No. 1) illustrating the gear shift process according to the embodiment of the present invention.
Figure 19:
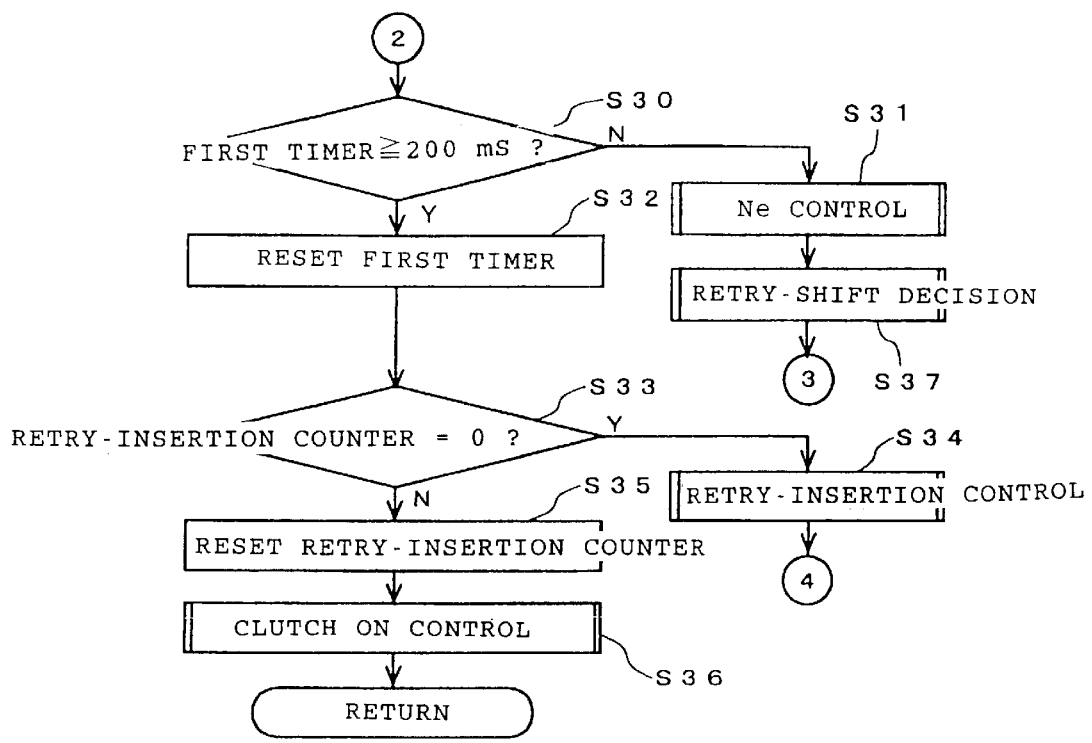
FIG. 19 is a flowchart (No. 3) illustrating the gear shift process according to the embodiment of the present invention.

On the other hand, if it is decided at step S16 shown in FIG. 17 that the turning angle $\theta_o$ is less than the first reference angle $\theta$ REF, the process goes on to step S30 shown in FIG. 19.

At step S30, it is decided whether or not the period of time counted by the first timer exceeds 200 ms. Since it is first decided that the period of time counted by the first timer does not exceed 200 ms, the process goes on to step S31 at which the Ne control is executed, and further goes on to step S37 at which the "decision of retry-shift" is executed. Then, the process is returned to step S16 shown in FIG. 17.

When the period of time counted by the first timer exceeds 200 ms, which means that the present gear shift has failed, the first timer is reset at step S32. It is decided at step S33 whether or not a count value of a retry-insertion counter is zero. If the count value of the retry-insertion counter is zero (which means that the retry-insertion counter is in the reset state), it is decided that the retry-insertion control is not executed, and the process goes on to step S34 at which the retry-insertion control is executed as will be described later. This is because, if the gear shift consumes a lot of time, the driver may sometimes feel a sense of incongruity.

If the count value of the retry-insertion counter is in the set state (=1), it is decided that the gear shift has failed although the retry-insertion control has been executed, and the process goes on to step S35 for clutch connection without executing gear shift. At step S35, the retry-insertion counter is reset and at step S36, clutch connection control to be described in detail later is executed.

Figure 20:
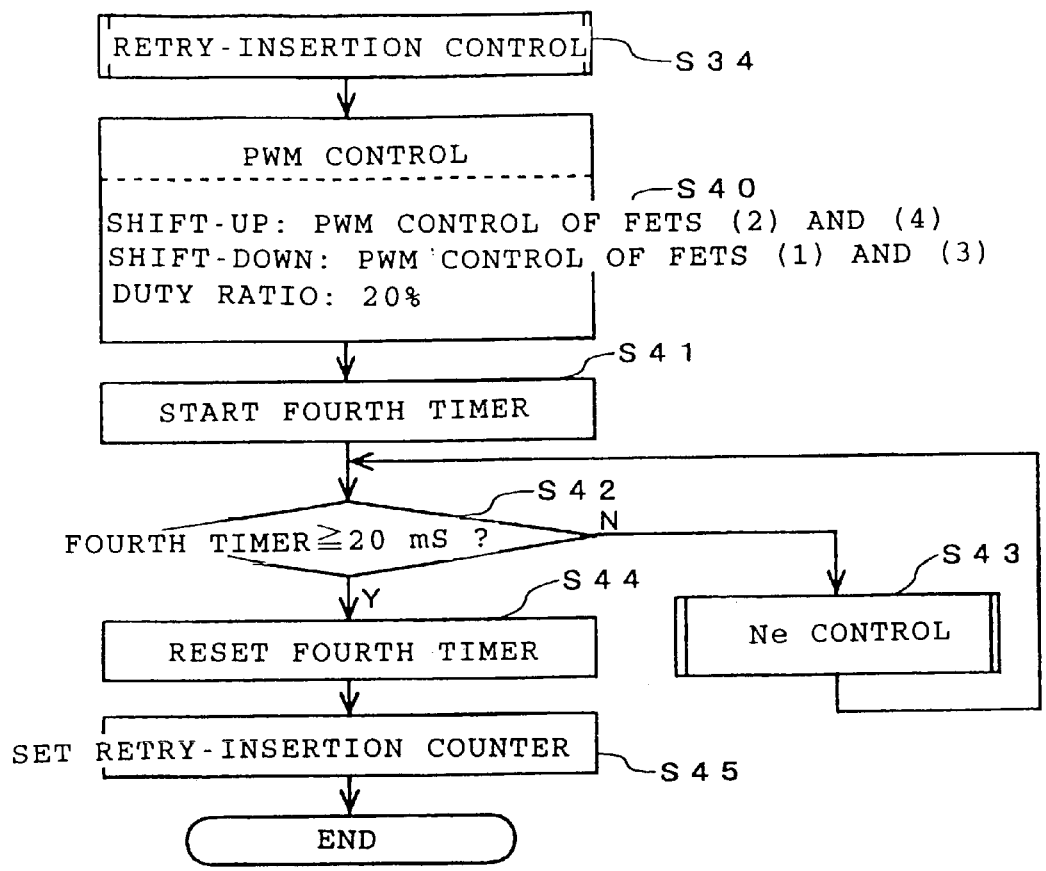
FIG. 20 is a flowchart (No. 4) illustrating the gear shift process according to the embodiment of the present invention.

The retry-insertion control will be described with reference to a flowchart shown in FIG. 20. The retry-insertion control is a process that if the sleeve axially translated by the shift fork cannot be moved up to the normal fitting position, the movement torque is temporarily reduced and then a specific torque is given to retry movement of the sleeve for retry-insertion of the dowels of the sleeve.

At step S40, the duty ratios of the FETs under PWM control (the FETs (2) and (4) during shift-up, or the FETs (1) and (3) if during shift-down) are each reduced to 20%. As a result, the drive torque applied to the sleeve by the shift fork 11 is weakened.

At step S41, the fourth timer starts time-counting, and at step S42, it is decided whether or not the period of time counted by the fourth timer exceeds 20 ms. If the period of time does not exceed 20 ms, the process goes on to step S43 at which the Ne control is executed. If the period of time exceeds 20 ms, the process goes on to step S44 at which the fourth timer is reset. At step S45, the retry-insertion counter is set. The process is then returned to step S13 shown in FIG. 17 at which the drive motor 1 is again subjected to PWM control at a 100% duty ratio for applying the initial large torque to the sleeve.

According to this embodiment, if the gear shift is not normally performed, the pressing torque applied to the sleeve is temporarily weakened and then the strong torque is again applied to the sleeve, so that it is possible to easily execute the retry-insertion control of the sleeve.

Here, prior to description of the operations for the Ne control and clutch ON control, the aim and schematic operation of each control will be described with reference to FIGS. 23 and 24.

Figure 27:
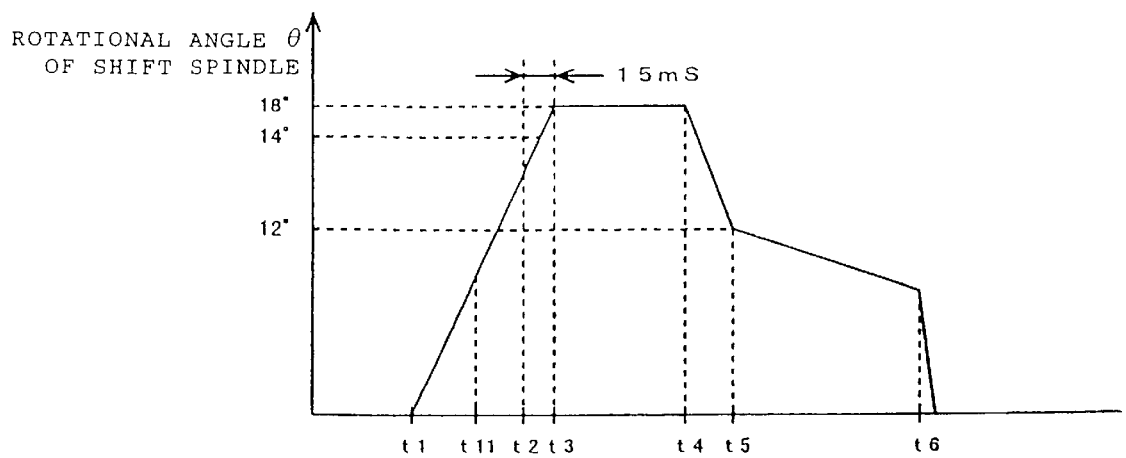
FIG. 27 is an operational timing chart of a shift spindle according to the present invention.

As shown in FIG. 27, in this embodiment, the turning of the shift spindle starts at the time t1; the clutch connection is released at a time t11; the turning of the shift spindle is ended at the time t3; and the pressing control is executed until the time t4, followed by the clutch connection control.

To relieve a gear shift shock, it is required to perform clutch connection at a low speed by making the turning speed of the shift spindle 3 lower. On the contrary, to realize quick gear shift, it is required to make the turning speed of the shift spindle higher because the gear shift speed is dependent on the turning speed of the shift spindle 3.

According to the present invention, to simultaneously satisfy the above-described two requirements, as shown in FIG. 27, the clutch connection control is executed by turning the shift spindle 3 at a high speed until the vicinity of an angle range in which the clutch connection is established (or in a period from the time t4 to a time t5); and turning the shift spindle 3 at a low speed in the angle range in which the clutch connection is established (after the time t5). With this two-stage return control, in this embodiment, it is possible to shorten the gear-shift time while reducing a gear shift shock.

According to this embodiment, when the gear-shift mode is the "semi-auto" mode, the clutch connection timing can be optimally controlled in accordance with the acceleration operation performed by the driver.

Figure 23:
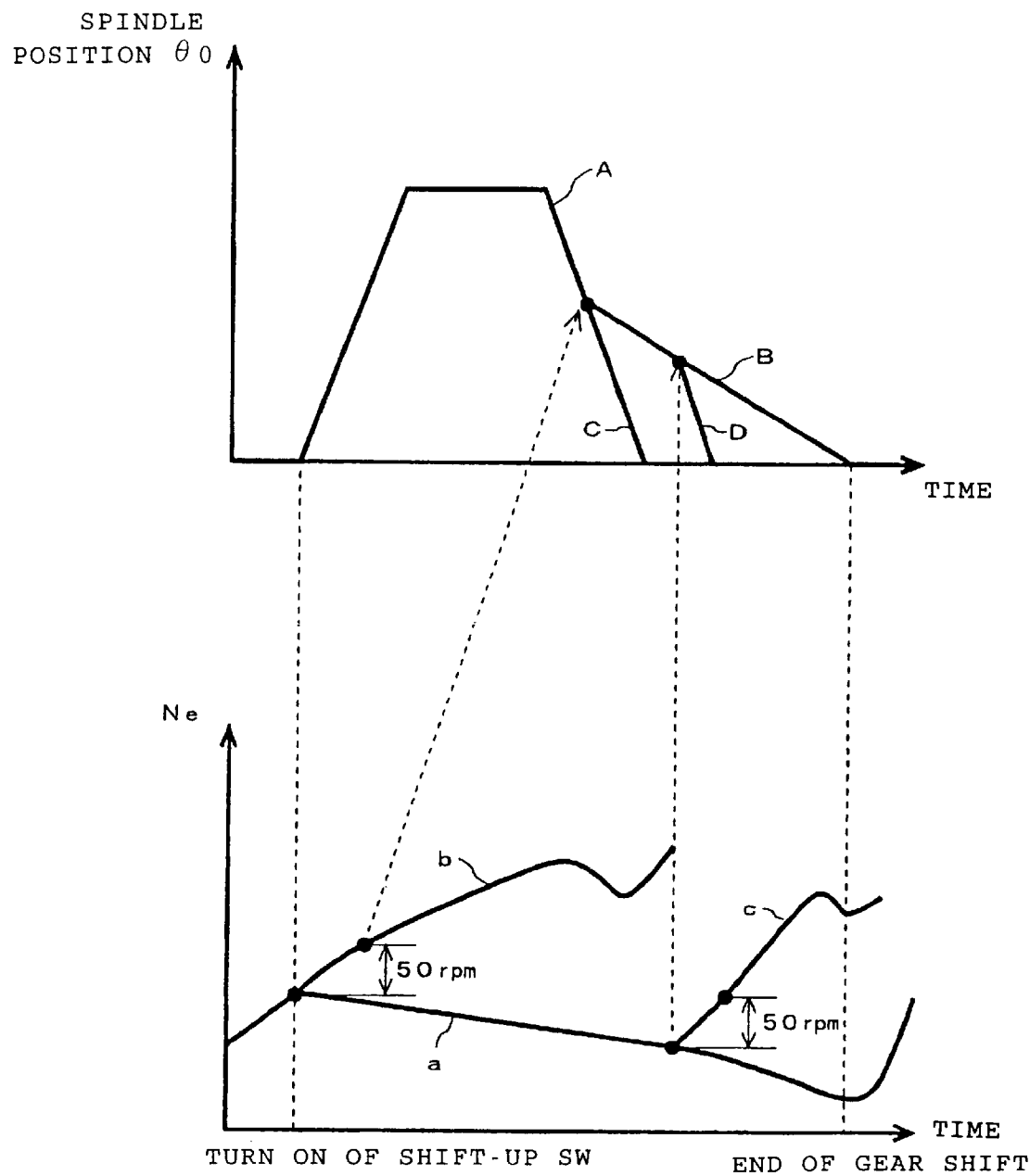
FIG. 23 is an operational timing chart showing changes in position of the shift spindle and engine speed (upon shift-up)
Figure 24:
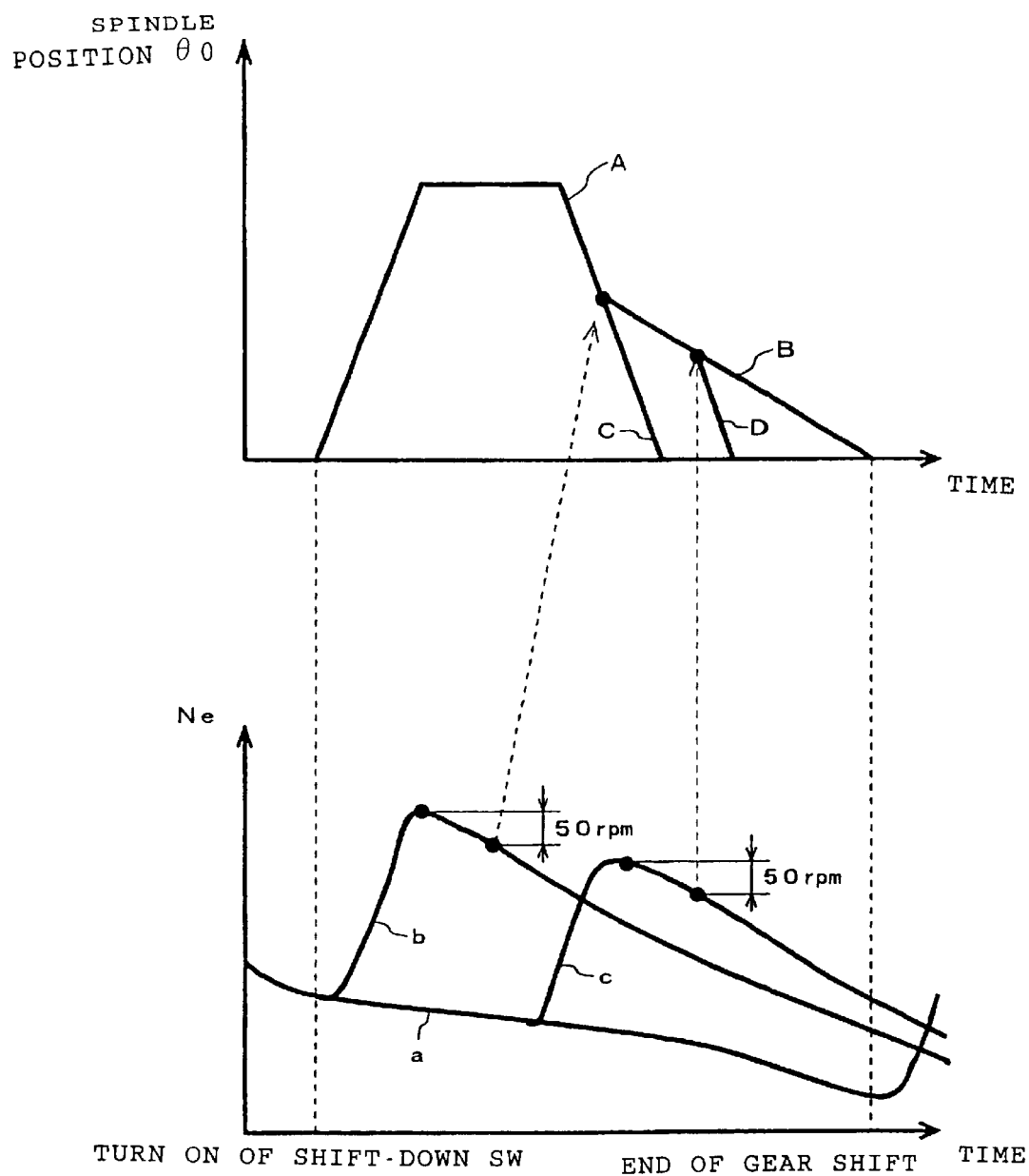
FIG. 24 is an operational timing chart showing changes in position of the shift spindle and engine speed (upon shift-down)

FIGS. 23 and 24 are operational timing charts showing changes in the shift spindle position $\theta_o$ and engine speed Ne caused by the clutch ON control and the Ne control executed upon shift-up and shift-down, respectively.

As shown in FIG. 23, the shift-up operation is generally performed by turning on the shift-up switch 51 after return of the accelerator, and opening the accelerator after re-connection of the clutch is established. During this shift-up operation, the engine speed Ne is changed as shown by a solid line "a". At this time, the shift spindle is controlled in two stages as shown by solid lines A and B.

However, the driver may operates the shift-up switch 51 without return of the accelerator or may open the accelerator before re-connection of the clutch. In such a case, to meet the driver's requirement for quick shift change, it may be desirable to quickly perform clutch connection.

According to this embodiment, if the engine speed Ne is changed as shown by a solid-line "b", it is decided that the shift-up switch 51 is turned on without return of the accelerator by the driver, and the quick-return control for immediate clutch connection is executed as shown by a solid line C, and if the engine speed Ne is changed as shown by a solid line "c", it is decided that the accelerator is opened earlier than a clutch connection timing, and the quick-return control for immediate clutch connection is executed as shown by a solid line D.

As shown in FIG. 24, the shift-down operation is generally performed by turning on the shift-down switch 52 after return of the accelerator, and opening the accelerator after re-connection of the clutch. During this shift-up operation, the engine speed Ne is changed as shown by a solid line "a". At this time, the shift spindle is controlled in two stages as shown by the solid lines A and B.

Upon shift-down, however, the engine may be idled by the driver. In such a case, to ensure good riding comfort, it may be desirable to quickly perform clutch connection.

According to this embodiment, if the engine speed Ne is changed as shown by a solid line "b" or "c", it is decided that the engine is idled by the driver, and the quick-return control is performed as shown by a solid-line C or D.

Figure 21:
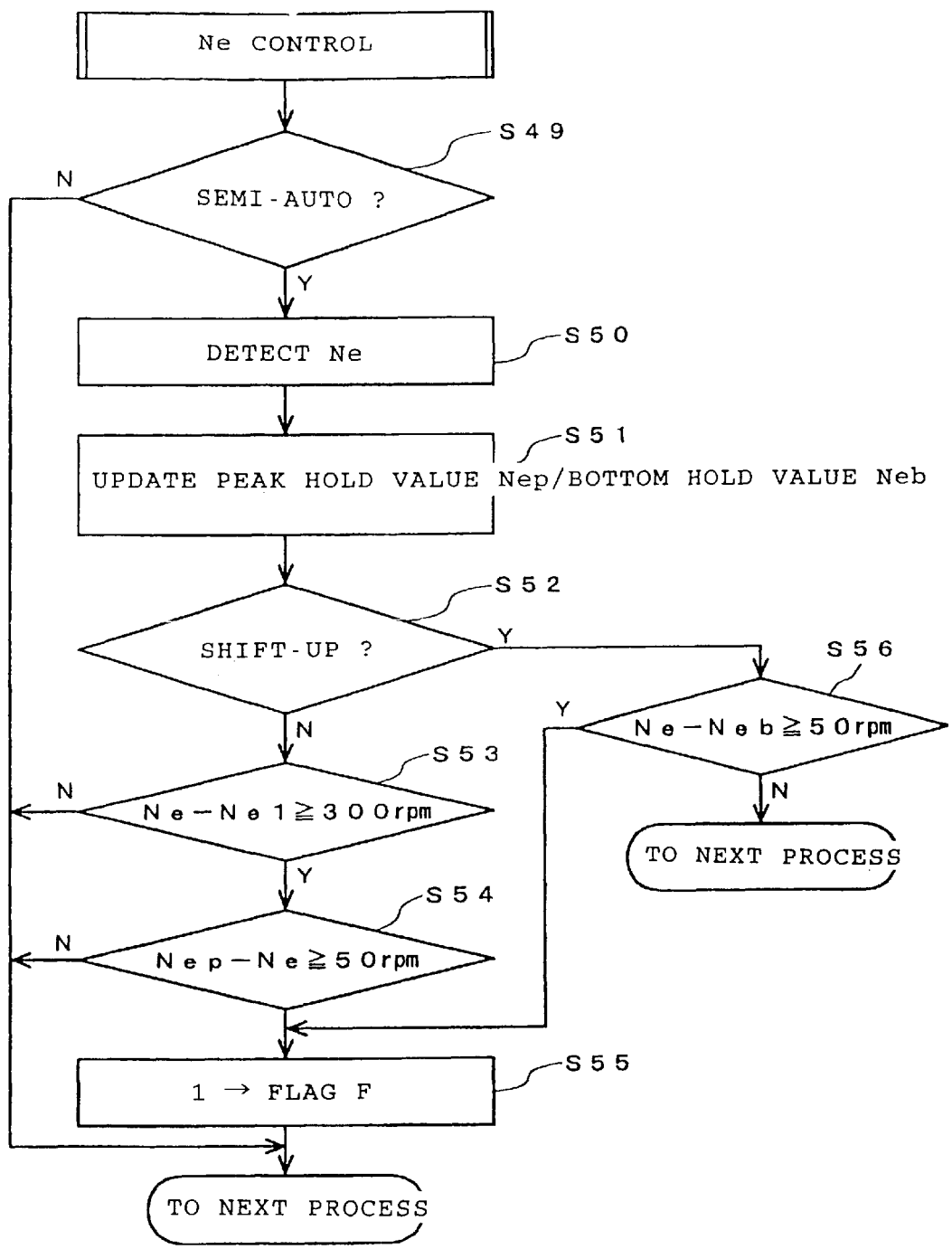
FIG. 21 is a flowchart (No. 5) illustrating the gear shift process according to the embodiment of the present invention.

The operations for the Ne control and clutch ON control for realizing the above-described two-stage return control and quick return control will be described in detail below. FIG. 21 is a flow chart showing the Ne control method to be executed in steps S21, S46, S31, and S43.

At step S49, it is decided whether the present shift mode is the "auto" mode or the "semi-auto" mode. If the present shift mode is the "auto" mode, which indicates that the Ne control is not required to be performed, the process is immediately ended, and if it is the "semi-auto" mode, the process goes on to step S50 at which the present engine speed Ne is measured.

At step S51, a peak hold value Nep and a bottom hold value Neb of the engine speeds Ne having been measured until now are updated on the basis of the present engine speed Ne. At step S52, it is decided whether the gear is during shift-up or shift-down. If during shift-up, the process goes on to step S56, and if during shift-down, the process goes on to step S53.

At step S56, it is decided whether or not a difference (Ne-Neb) between the present engine speed Ne detected at step S50 and the bottom hold value Neb updated at step S51 is 50 rpm or more.

This decision is a decision whether or not the accelerator is closed upon shift-up. If the difference is 50 rpm or more, it is decided that the shift-up switch 51 is turned on without return of the accelerator by the driver or the accelerator is opened earlier than the clutch connection timing. In this case, the process goes on to step S55 at which a quick-return flag F is set for immediate clutch connection, and the process is ended. If the difference is less than 50 rpm, the engine speed control is ended without setting the quick-return flag F for continuing the usual control.

If it is decided at step S52 that the shift-down state is continued, the process goes on to step S53 at which it is decided whether or not a difference (Ne-Ne1) between the present engine speed Ne and the engine speed Ne1 stored at the above-described step S12 is 300 rpm or more. If the difference is 300 rpm or more, it is decided at step S54 whether or not a difference (Nep-Ne) between the peak hold value Nep updated at step S51 and the present engine speed Ne is 50 rpm or more.

This decision is a decision whether or not the engine is idled by the driver upon shift-down. If YES at both steps S53 and S54, it is decided that the engine is idled by the driver upon shift-down, and the process goes on to step S55 at which the quick-return flag F is set, and the process is ended.

Figure 22:
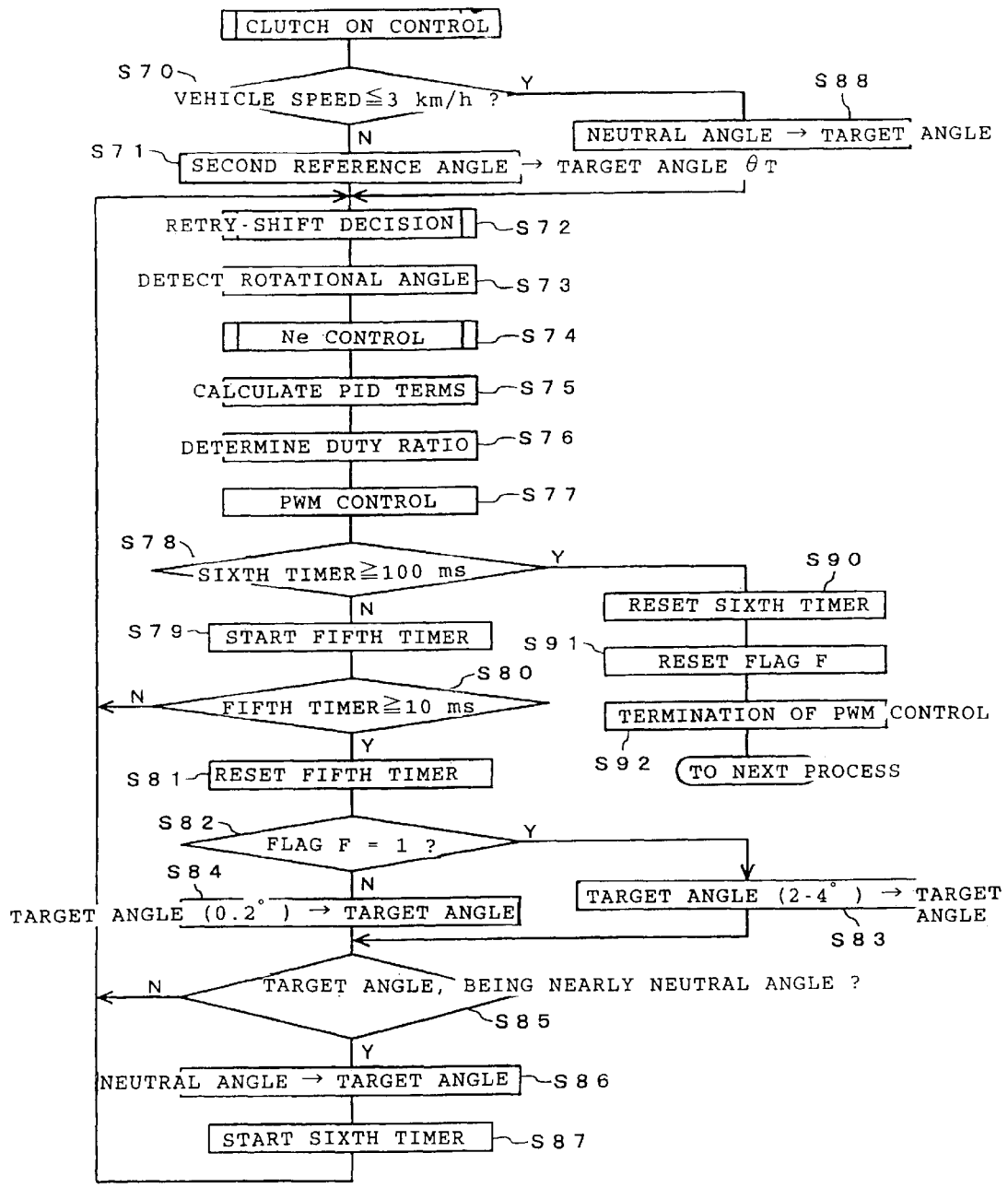
FIG. 22 is a flowchart (No. 6) illustrating the gear shift process according to the embodiment of the present invention.

FIG. 22 is a flow chart showing the clutch ON control to be executed at steps S28 and S36.

At step S70, it is decided whether or not the vehicular speed is approximately zero. In this embodiment, if the vehicular speed is 3 km/h or less, it is decided that the vehicular speed becomes approximately zero, and the process goes on to step S88 at which a neutral position of the shift spindle 3 is set to a target angle T, and thereafter, the process goes on to step S72. The reason for this is as follows: namely, since the gear shift is performed in the state in which the vehicle is substantially stopped and in such a case there occurs no gear shift shock, it is desired to quickly perform the gear shift.

If it is decided at step S70 that the vehicular speed is 3 km/h or more, the process goes on to step S71 at which a second reference angle (±12°) returned by 6 from an angle (±18° in this embodiment) at which the turning of the shift spindle 3 is restricted by the stopper is set at the target angle T, and thereafter the process goes on to step S72.

At step S72, the retry-shift control to be described later is executed. At step S73, a present turning angle $\theta_o$ of the shift spindle 3 is detected by the angle sensor 28. At step S74, the Ne control is executed.

At step S75, a PID (Proportional plus Integral plus Derivative) additional value for PID control is calculated. To be more specific, a proportional (P) term represented by a difference $(\theta_o-\theta_T)$ between the present turning angle $\theta_o$ detected at step S73 and the target angle $\theta_T$, an integral (I) term which is an integral value of the P term, and a derivative (D) term which is a derivative value of the P term are calculated and added to each other. At step S76, duty ratio for PWM control is determined on the basis of the PID additional value thus obtained and at step S77, the PWM control is executed.

Figure 25:
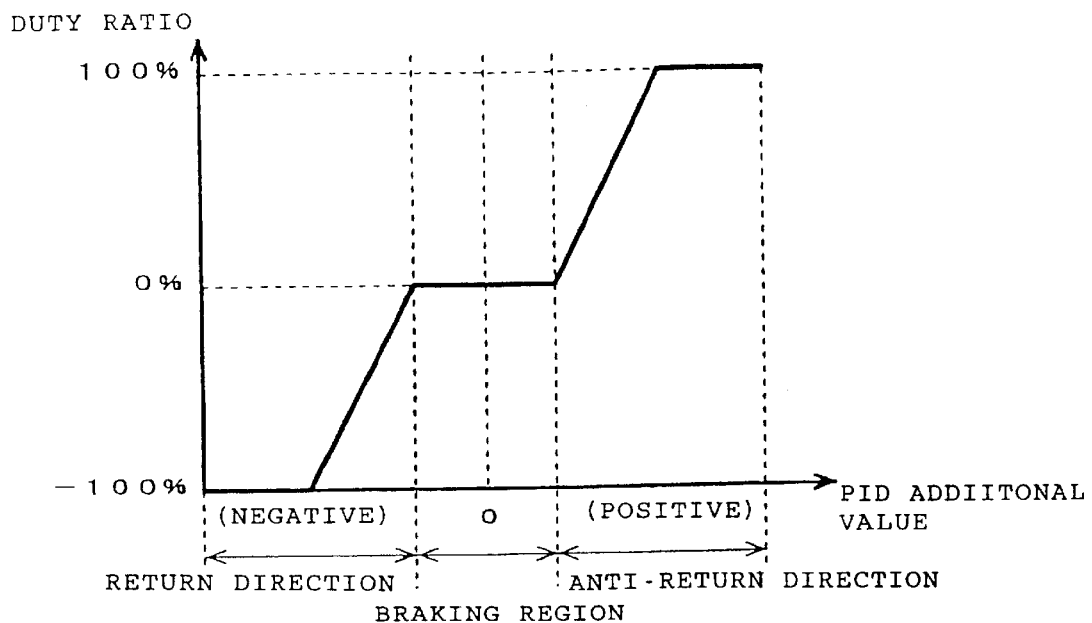
FIG. 25 is a graph showing a relationship between a PID additional value and a duty ratio.

FIG. 25 is a graph showing a relationship between a PID additional value and a duty ratio. If a PID additional value is positive, a positive duty ratio is correspondingly selected, and if a PID additional value is negative, a negative duty ratio is correspondingly selected. Here, the positive (+)/ negative (−) duty ratio designates a combination of the FETs subjected to PWM control. For example, +50% duty ratio means that the FETs (2) and (4) are subjected to PWM control at a 50% duty ratio, and −50% duty ratio means that the FETs (1) and (3) are subjected to PWM control at a 50% duty ratio.

At step S78, it is decided whether or not the period of time counted by a sixth timer exceeds 100 ms. Since the sixth timer does not start time-counting at the initial stage, the process goes on to step S79. At step S79, a fifth timer starts time-counting. At step S80, it is decided whether or not the period of time counted by the fifth timer exceeds 10 ms. Since it does not exceeds 10 ms at the initial stage, the process is returned to step S72. After that the operations at steps S72 to S80 are repeated.

After that, when the period of time counted by the fifth timer exceeds 10 ms at a time t5 shown in FIG. 27, the fifth timer is reset at step S81. At step S82, it is decided whether or not the quick return flag F is in the set state. If the flag F is in the set state, the process goes on to step S83 at which an angle obtained by subtracting an angle of 2 to 4° from the present target angle is registered as a new target angle for executing the quick return control. If the flag F is not in the set state, the process goes on to step S84 at which an angle obtained by subtracting an angle of 0.2° from the present target angle is registered as a new target angle.

At step S85, it is decided whether or not the target angle is close to the neutral angle, and the operations at steps S72 to S85 are repeated until the target angle becomes sufficiently close to the neutral angle. After that, when the target angle becomes sufficiently close to the neutral angle, the neutral angle is registered as the target angle at step S86. At step S87, the sixth timer starts time-counting.

On the other hand, if it is decided at step S78 that the period of time counted by the sixth timer exceeds 100 ms, the process goes on to step S90 at which the sixth timer is reset. At step S91, the quick return flag F is reset, and at step S92, the PWM control in the switching circuit 105 is ended.

Figure 26:
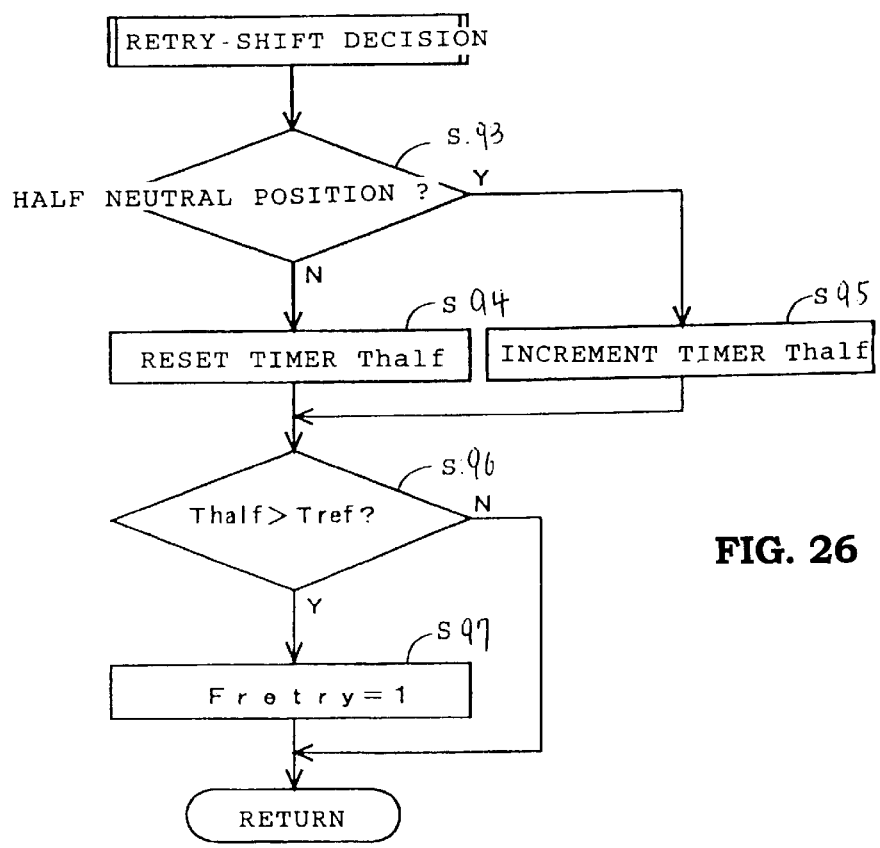
FIG. 26 is a flow chart showing a method of deciding retry-shift.

Next, the retry-shift decision process will be described with reference to the flow chart shown in FIG. 26. The retry-shift decision process in the embodiment is a process for deciding whether or not the shift operation should be retried on the basis of the fact whether or not the shift operation is normally ended. According to this embodiment, it is decided whether or not the shift operation is normally ended on the basis of the rotational angle of the shift drum.

At step S91, it is decided whether or not the rotational position of the shift drum 10 is at the half neutral position on the basis of an output signal from the shift drum sensor 906 described with reference to FIGS. 28 to 30. If it is decided that the shift drum 10 is in the half neutral state in which the stopper 903 rides on the projection of the cam plate 902 as shown in FIG. 29, the process goes on to step S93 at which a timer Thalf is incremented for measuring a time required for the shift drum 10 to stay in the half neutral state. At step S94, the period of time counted by the timer Thalf is compared with a reference value Tref. Since the period of time counted by the timer Thalf is smaller than the reference value Tref at the initial stage, the process is ended.

After that, if the shift drum 10 is released from the half neutral state, the timer Thalf is reset at step S92. If the shift drum 10 is left stayed in the half neutral state and the period of time counted by the timer Thalf exceeds the reference value Tref at step S94, it is decided that the shift drum 10 is in the half neutral state, and the process goes on to step S95 at which the retry-shift flag Fretry is set.

Referring again to FIG. 16, after the "shift-up/shift-down control" at step S5 is ended, it is decided at step S6 whether or not the retry-shift flag Fretry is set. If the retry-shift flag Fretry has been set at step S95, the process is returned to step S3 for executing the retry-shift process, and then the operations at steps S3 to S6 are repeated.

In this way, according to this embodiment, it is decided whether or not the shift drum is in the half neutral state on the basis of the rotational position of the shift drum 10, and if it is decided that the shift drum is in the half neutral state, the retry-shift process is automatically performed. Accordingly, even for a full-automatic motor-driven gear shifter in which gear shift is automatically performed on the basis of a vehicle speed and a throttle opening degree, the shift drum can be quickly released from the half neutral state.

If the gear is shifted from the neutral state upon high speed running of the vehicle or upon high speed rotation of the engine, an excessively high load is applied to the engine because a relatively high engine brake force is applied. From this viewpoint, according to this embodiment, there is provided a gear shift prohibiting system for prohibiting the control shown in FIG. 17 even if the shift-up switch 51 is turned on, in the case where the vehicular speed is 10 km/h or more or the engine speed is 3000 rpm or more.

Figure 11:
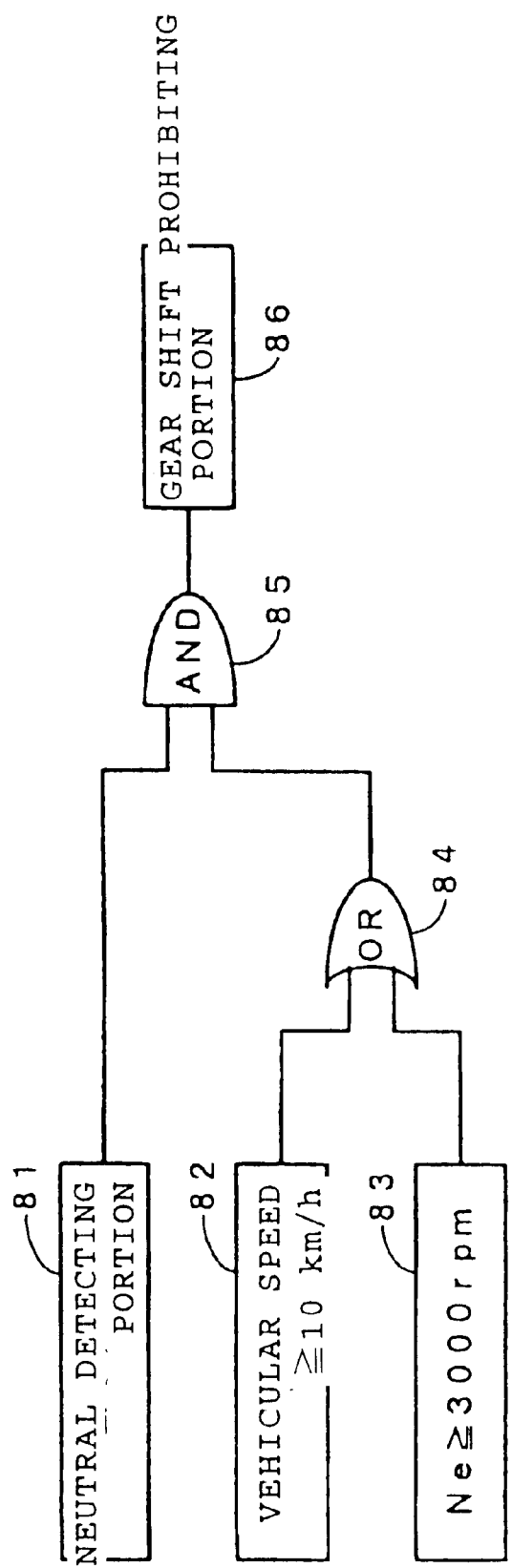
FIG. 11 is a block diagram showing a function of a gear shift prohibiting system.

FIG. 11 is a block diagram showing a function of the gear shift prohibiting system. A neutral detecting portion 81 outputs a signal of an "H" level when the gear is located at the neutral position. A vehicular speed decision portion 82 outputs a signal of an "H" level when the vehicular speed is 10 km/h or more. An engine speed decision portion 83 outputs a signal of an "H" level when the engine speed is 3000 rpm or more.

An OR circuit 84 outputs a signal of an "H" level when the output of the vehicular speed decision portion 82 or the engine speed decision portion 83 is at the "H" level. An AND circuit 85 outputs a signal of an "H" level when the outputs of the OR circuit 84 and the neutral detecting portion 81 are each at the "H" level. If the output of the AND circuit 85 is at the "H" level, a gear shift prohibiting portion 86 prohibits the control shown in FIG. 17 even if the shift-up switch 51 is turned on.

However, if the gear is erroneously shifted to the neutral at the vehicular speed of 10 km/h or more or at the engine speed of 3000 rpm or more during acceleration from the first speed, it takes a lot of time to execute re-acceleration. Accordingly, in the case of additionally providing the above-described gear shift prohibiting system, there may be further provided a system of prohibiting the gear shift to the neutral during running of the vehicle at a vehicular speed of 3 km/h or more.

Additionally, in this embodiment, the shift drum sensor 906 is configured to discontinuously generate a voltage corresponding to the rotational position of the shift drum 10 (gear stage); however, there may be adopted a configuration in which the sensor continuously generates a voltage corresponding to the rotational position of the shift drum 10, and a comparator disposed behind the sensor discontinuously generates a voltage corresponding to a gear stage.

According to the present invention, it is decided whether or not the shift drum is in the half neutral state on the basis of the rotational position of the shift drum, and if it is decided that the shift drum is in the half neutral state, the retry-shift process is automatically performed. Accordingly, for a full-automatic motor-driven gear shifter in which gear shift is automatically performed on the basis of a vehicle speed and a throttle opening degree, it is possible to allow the shift drum to be quickly released from the half neutral state, and for a semi-automatic motor-driven gear shifter, it is possible to eliminate the need of repetition of the gear-shift operation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for controlling a gear-shift of a motor-driven gear shifter in which a motor is driven in a desired shift direction, to intermittently turn a shift drum, thereby shifting one gear stage to another gear stage comprising:

a detecting means for detecting a rotational position of said shift drum; and a retry-shift means for re-driving said shift drum, when said shift drum stays at the rotational position other than a normal rotational position, wherein said detecting means is a shift drum sensor provided on a shift drum shaft, and said shift drum sensor generates an output voltage corresponding to the gear shift stage.

2. The apparatus according to claim 1, wherein said shift drum sensor is configured as a rotary encoder.

3. The apparatus according to claim 1, wherein said shift drum sensor generates an output voltages corresponding to said rotational position of said shift drum.

4. The apparatus according to claim 1, wherein said rotational position of said shift drum is at a half neutral position.

5. The apparatus according to claim 3, wherein said half neutral position is based on an output signal from a shift drum sensor.

6. The apparatus according to claim 3, further comprising a stopper, said stopper riding on a projection of a cam plate when said shift drum is in said half neutral position.

7. The apparatus according to claim 3, further comprising a timer, said timer is incremented for measuring a time required for said shift drum to stay in said half neutral position.

8. The apparatus according to claim 7, wherein said timer is counted by a period of time which is compared with a reference value.

9. The apparatus according to claim 7, wherein said timer is reset when said shift drum is released from said half neutral state.

10. A method for controlling a gear-shift of a motor-driven gear shifter in which a motor is driven in a desired shift direction, to intermittently turn a shift drum, thereby shifting one gear stage comprising the steps of:

detecting a rotational position of said shift drum; and providing a retry-shift means for re-driving said shift drum, when said shift drum stays at said rotational position other than a normal rotational position, wherein the step of detecting said rotational position further comprises the step of providing a shift drum sensor on a shift drum shaft, and the step of generating an output voltage corresponding to said gear shift stage.

11. The method according to claim 10, wherein said method further comprises the step of deciding whether or not said rotational position of said shift drum is at a half neutral position on the basis of an output signal from a shift drum sensor.

12. The method according to claim 11, wherein said method further comprises the step of providing a stopper, said stopper rides on a projection of a cam plate when said shift drum is in said half neutral position.

13. The method according to claim 11, wherein said method further comprises the step of providing a timer, said timer is incremented for measuring a time required for said shift drum to stay in said half neutral state.

14. The method according to claim 13, wherein said step of providing said timer further comprises the step of counting a period of time which is compared with a reference value.

15. The method according to claim 11, wherein the method further comprises the step of providing a timer and the step of resetting said shift drum when it is released from said half neutral position.

* * * * *